US012706814B2

(12) United States Patent
Chakravarty et al.

(10) Patent No.: US 12,706,814 B2
(45) Date of Patent: Aug. 11, 2026

(54) NETWORK ALLOCATION AND MONITORING ENGINE USING ARTIFICIAL INTELLIGENCE AND DYNAMIC MAPPING

(71) Applicant: BANK OF AMERICA CORPORATION, Charlotte, NC (US)

(72) Inventors: Srinath S. Chakravarty, Plano, TX (US); Dinesh Kumar Agrawal, Rowlett, TX (US); Stephen R. Belton, Garden City, NY (US); Manmohan Datla-Viswasai, Frisco, TX (US); Steven Nathan Greene, Scarsdale, NY (US); Tonya Kyra Miller, Charlotte, NC (US); Petar Puskarich, Murphy, TX (US); Madhukiran Bangalore Ramachandra, San Ramon, CA (US); Elina Shkodnik, Staten Island, NY (US); Aravind Singtalur, McKinney, TX (US); Kerry Vaughan, Lawrenceville, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 109 days.

(21) Appl. No.: 18/927,222

(22) Filed: Oct. 25, 2024

(65) Prior Publication Data

US 2026/0121938 A1 Apr. 30, 2026

(51) Int. Cl.
*H04L 41/16* (2022.01)
*H04L 43/04* (2022.01)

(52) U.S. Cl.
CPC .............. *H04L 41/16* (2013.01); *H04L 43/04* (2013.01)

(58) Field of Classification Search
None
See application file for complete search history.

(56) References Cited

U.S. PATENT DOCUMENTS

| | | | |
|---|---|---|---|
| 9,356,838 B1 * | 5/2016 | Wang | H04L 41/122 |
| 10,319,056 B1 | 6/2019 | Perez et al. | |
| 11,146,497 B2 | 10/2021 | Larsson et al. | |
| 11,184,248 B1 | 11/2021 | Ahuja et al. | |
| 11,658,921 B2 | 5/2023 | Yang et al. | |
| 2016/0142337 A1 | 5/2016 | Skvortsov et al. | |
| 2016/0285704 A1 | 9/2016 | Gasparakis et al. | |

(Continued)

*Primary Examiner* — Joshua Joo
(74) *Attorney, Agent, or Firm* — Moore & Van Allen PLLC; Mike Papakonstantinou

(57) ABSTRACT

Systems, computer program products, and methods are described herein for network allocation and monitoring engine using artificial intelligence (AI) and dynamic mapping. The present disclosure is directed to extracting data from network data packets received from at least one or more data sources and uses an AI engine to identify network resources and network threats. The AI engine generates at least one network attribute set based on at least the network resources and network threats and determines and assigns a weight for each of the at least one network attribute set. The AI engine generates a directed graph based on at least the network attribute set, which is associated with at least one distributed network, and determines an internal network threshold based on at least the directed graph. The AI engine generates an internal distributed network resources allocation based on at least the directed graph and the internal network threshold.

20 Claims, 14 Drawing Sheets

(56) References Cited

U.S. PATENT DOCUMENTS

2016/0352584 A1 12/2016 Roy
2016/0359697 A1* 12/2016 Scheib ................ G06F 9/45558
2017/0163493 A1 6/2017 Auyoung et al.
2018/0302340 A1 10/2018 Alvarez Callau et al.
2020/0067783 A1* 2/2020 Kamath .................. H04L 43/08
2022/0007199 A1 1/2022 Mahalingam et al.
2022/0029875 A1 1/2022 Wu et al.
2022/0232531 A1 7/2022 Li et al.
2022/0309425 A1 9/2022 Hatfield et al.
2022/0417081 A1* 12/2022 Zafer .................. H04L 41/0654
2022/0417105 A1 12/2022 Parker, Jr. et al.
2023/0031767 A1 2/2023 Bhattacharya et al.
2023/0130448 A1 4/2023 Abdi et al.
2024/0062129 A1 2/2024 Porrata et al.
2024/0118929 A1 4/2024 Meng et al.
2024/0296468 A1 9/2024 Subhedar et al.
2024/0303127 A1 9/2024 White et al.
2024/0323081 A1 9/2024 Sharma et al.
2025/0037041 A1* 1/2025 Mimassi ................ G06Q 10/02
2025/0203917 A1* 6/2025 Liu ........................ H10D 30/62

* cited by examiner 140
156
162
164
166
170
160
152
158
168
154

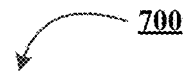

RENDER A PLURALITY OF DIRECTED GRAPHS WITHIN THE USER INTERFACE, WHEREIN THE PLURALITY OF DIRECTED GRAPHS COMPRISES THE DIRECTED GRAPH AND AT LEAST ONE ADDITIONAL DIRECTED GRAPH ASSOCIATED WITH AN ADDITIONAL DISTRIBUTED NETWORK
702

RECEIVE CONTROL SIGNALS FROM THE AT LEAST ONE DEVICE ASSOCIATED WITH THE AT LEAST ONE INTERACTIVE MIXED REALITY APPLICATION, WHEREIN THE CONTROL SIGNALS COMPRISE INTERACTIONS WITH AT LEAST ONE OF ONE OR MORE PHYSICAL CONTROLS OR ONE OR MORE VIRTUAL OBJECTS
704

MODIFY AT LEAST ONE VIEW OF THE PLURALITY OF DIRECTED GRAPHS WITHIN THE USER INTERFACE BASED ON AT LEAST THE CONTROL SIGNALS
706

FIGURE 7

NETWORK ALLOCATION AND MONITORING ENGINE USING ARTIFICIAL INTELLIGENCE AND DYNAMIC MAPPING

TECHNOLOGICAL FIELD

Example embodiments of the present disclosure relate to network allocation and monitoring engine using artificial intelligence (AI) and dynamic mapping.

BACKGROUND

Dynamic network activity and evolving network threat levels impact network allocation and monitoring. Network administrators and operators must monitor network packet data to detect threats and allocate existing network resources to maximize network resource utilization, avoid network resource waste, and mitigate against network threats. Poor execution of network resource allocation can result in diminution of network resources and additional exposure to external network threats. In addition, network resource allocation requires holistic evaluations based on network resources, forecast network resources, known network threats, and emerging vulnerabilities. However, network resource allocation often utilizes incomplete datasets, flawed network criteria, and lack dynamic network data monitoring, resulting in inefficiency, technical resource consumption, and unbalanced network resource allocations.

With rapidly evolving network conditions, it is essential to develop essential methods for effective network allocation and monitoring. Conventional solutions rely on manual determinations, inefficient data aggregation, error-prone methodology, and fail to account for dynamic network data and evolving network conditions.

Applicant has identified a number of deficiencies and problems associated with network allocation and monitoring engine using AI and dynamic mapping. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for network allocation and monitoring engine using AI and dynamic mapping.

In one aspect, a system for network allocation and monitoring engine using artificial intelligence and dynamic mapping is provided. In some embodiments, the system may comprise: a memory device with computer-readable program code stored thereon; at least one processing device, wherein executing the computer-readable program code is configured to cause the at least one processing device to execute the computer-readable program code to: extract data from network data packets received from at least one or more data sources; identify, using an AI engine, network resources and network threats from the data; generate, using the AI engine, at least one network attribute set based on at least the network resources and network threats; determine and assign, using the AI engine, a weight for each of the at least one network attribute set; generate, using the AI engine, a directed graph based on at least the network attribute set, wherein the directed graph is associated with at least one distributed network; determine, using the AI engine, an internal network threshold based on at least the directed graph; and generate, using the AI engine, an internal distributed network resources allocation based on at least the directed graph and the internal network threshold.

In some embodiments, executing the computer-readable program code is further configured to cause the at least one processing device to: extract external data from external network data packets received from at least one external distributed network; determine, using the AI engine, external network resources, external network threats, and an external distributed network resources allocation from the external data; generate, using the AI engine, at least one external network attribute set based on at least the external network resources, external network threats, and the external distributed network resources allocation; determine and assign, using the AI engine, an external weight for each of the at least one external network attribute set; modify, using the AI engine, the directed graph based on at least the external network attribute set; determine, using the AI engine, an external network threshold based on at least the directed graph and the external distributed network resources allocation; and generate, using the AI engine, a comparison of the internal network threshold and the external network threshold.

In some embodiments, executing the computer-readable program code is further configured to cause the at least one processing device to: receive the internal network threshold and the internal distributed network resources allocation for each at least one internal distributed network and the external distributed network resources allocation and the external network threshold for each at least one at least one external distributed network; generate and assign, using the AI engine, a global internal distributed network weight based on at least the internal network threshold and the internal distributed network resources allocation for each at least one internal distributed network; generate and assign, using the AI engine, a global external distributed network weight based on at least the external network threshold and the external distributed network resources allocation for each at least one external distributed network; determine, using the AI engine, a global internal distributed network threshold based on at least the global internal distributed network weight; determine, using the AI engine, a global external distributed network threshold based on at least the global external distributed network weight; generate, using the AI engine, a global network threat map and a network comparison of the global internal distributed network threshold and the global external distributed network threshold; and transmit a notification comprising the global network threat map and the network comparison.

In some embodiments, executing the computer-readable program code is further configured to cause the at least one processing device to: generate a user interface on a display, wherein the user interface comprises at least one interactive mixed reality application; render an interactive dashboard and the directed graph within the user interface; and receive control signals from at least one device to navigate the user interface, wherein the control signals modify the interactive dashboard and the directed graph within the user interface.

In some embodiments, executing the computer-readable program code is further configured to cause the at least one processing device to: render a plurality of directed graphs within the user interface, wherein the plurality of directed graphs comprises the directed graph and at least one additional directed graph associated with an additional distributed network; receive control signals from the at least one device associated with the at least one interactive mixed reality application, wherein the control signals comprise interactions with at least one of one or more physical controls or one or more virtual objects; and modify at least one view of the plurality of directed graphs within the user interface based on at least the control signals.

In some embodiments, executing the computer-readable program code is further configured to cause the at least one processing device to: receive at least one historical dataset; train the AI engine based on the at least one historical dataset, wherein the at least one historical dataset comprises at least one of historical network resources, historical network threats, historical network attribute sets, historical weights for historical network attribute sets, historical directed graphs associated with distributed networks, historical internal network thresholds, historical internal distributed network resources allocations, historical external network data packets, historical external network resources, historical external network threats, historical external network resources allocations, historical external network attribute sets, historical external network thresholds, historical directed graphs, or historical comparisons of the internal network threshold and the external network threshold; receive network packet vulnerability data; update the at least one historical dataset with the network packet vulnerability data; and retrain the AI engine based on the network packet vulnerability data.

In some embodiments, executing the computer-readable program code is further configured to cause the at least one processing device to: generate a network event forecast AI engine; receive network event data associated with network switch checkpoints; determine, using the network event forecast AI engine, a network event threshold based on the network event data associated with network switch checkpoints; generate, using the network event forecast AI engine, revisions for the internal distributed network resources allocation based on at least the network event threshold; and transmit the revisions for the internal distributed network resources allocation based on at least the network event threshold via notification.

In some embodiments, executing the computer-readable program code is further configured to cause the at least one processing device to: determine, using the AI engine, an allocation threshold associated with the internal network threshold; and generate at least one alert based on at least the allocation threshold.

In some embodiments, executing the computer-readable program code is further configured to cause the at least one processing device to: access the network packet vulnerability data; determine, using the AI engine, to delete the internal distributed network resources allocation based on at least the network packet vulnerability data; and generate and transmit, using the AI engine, an alert comprising the internal distributed network resources allocation.

In some embodiments, executing the computer-readable program code is further configured to cause the at least one processing device to: receive a request from at least one device, wherein the request comprises revised network data; authenticate the request via multifactor authentication, wherein the multifactor authentication comprises at least two of a one-time password, a physical attribute authentication, authentication application, and authentication credentials; revise, using the AI engine, at least one of the at least one network attribute set, the directed graph, and the internal network threshold based on the request, wherein the request comprises updating the network resources and network threats; generate, using the AI engine a revised internal distributed network resources allocation; and transmit the revised internal distributed network resources allocation via notification.

In another aspect, a computer program product for network allocation and monitoring engine using artificial intelligence and dynamic mapping is provided. In some embodiments, the computer program product comprises at least one non-transitory computer-readable medium having computer-readable program code portion embodied therein, the computer-readable program code portions which when executed by a processing device are configured to cause a processor to: extract data from network data packets received from at least one or more data sources; identify, using an AI engine, network resources and network threats from the data; generate, using the AI engine, at least one network attribute set based on at least the network resources and network threats; determine and assign, using the AI engine, a weight for each of the at least one network attribute set; generate, using the AI engine, a directed graph based on at least the network attribute set, wherein the directed graph is associated with at least one distributed network; determine, using the AI engine, an internal network threshold based on at least the directed graph; and generate, using the AI engine, an internal distributed network resources allocation based on at least the directed graph and the internal network threshold.

In some embodiments, the processing device is further configured to: extract external data from external network data packets received from at least one external distributed network; determine, using the AI engine, external network resources, external network threats, and an external distributed network resources allocation from the external data; generate, using the AI engine, at least one external network attribute set based on at least the external network resources, external network threats, and the external distributed network resources allocation; determine and assign, using the AI engine, an external weight for each of the at least one external network attribute set; modify, using the AI engine, the directed graph based on at least the external network attribute set; determine, using the AI engine, an external network threshold based on at least the directed graph and the external distributed network resources allocation; and generate, using the AI engine, a comparison of the internal network threshold and the external network threshold.

In some embodiments, the processing device is further configured to: receive the internal network threshold and the internal distributed network resources allocation for each at least one internal distributed network and the external distributed network resources allocation and the external network threshold for each at least one at least one external distributed network; generate and assign, using the AI engine, a global internal distributed network weight based on at least the internal network threshold and the internal distributed network resources allocation for each at least one internal distributed network; generate and assign, using the AI engine, a global external distributed network weight based on at least the external network threshold and the external distributed network resources allocation for each at least one external distributed network; determine, using the AI engine, a global internal distributed network threshold based on at least the global internal distributed network weight; determine, using the AI engine, a global external distributed network threshold based on at least the global external distributed network weight; generate, using the AI engine, a global network threat map and a network comparison of the global internal distributed network threshold and the global external distributed network threshold; and transmit a notification comprising the global network threat map and the network comparison.

In some embodiments, the processing device is further configured to: generate a user interface on a display, wherein the user interface comprises at least one interactive mixed reality application; render an interactive dashboard and the directed graph within the user interface; and receive control signals from at least one device to navigate the user interface, wherein the control signals modify the interactive dashboard and the directed graph within the user interface.

In some embodiments, the processing device is further configured to: generate a network event forecast AI engine; receive network event data associated with network switch checkpoints; determining, using the network event forecast AI engine, a network event threshold based on the network event data associated with network switch checkpoints; generate, using the network event forecast AI engine, revisions for the internal distributed network resources allocation based on at least the network event threshold; and transmit the revisions for the internal distributed network resources allocation based on at least the network event threshold via notification.

In some embodiments, the processing device is further configured to: determine, using the AI engine, an allocation threshold associated with the internal network threshold; and generate at least one alert based on at least the allocation threshold.

In some embodiments, the processing device is further configured to: receive a request from at least one device, wherein the request comprises revised network data; authenticate the request via multifactor authentication, wherein the multifactor authentication comprises at least two of a one-time password, a physical attribute authentication, authentication application, and authentication credentials; revise, using the AI engine, at least one of the at least one network attribute set, the directed graph, and the internal network threshold based on the request, wherein the request comprises updating the network resources and network threats; generate, using the AI engine a revised internal distributed network resources allocation; and transmit the revised internal distributed network resources allocation via notification.

In another aspect, a computer-implemented method for network allocation and monitoring engine using artificial intelligence and dynamic mapping is provided. In some embodiments, the computer-implemented method comprising: extracting data from network data packets received from at least one or more data sources; identifying, using an AI engine, network resources and network threats from the data; generating, using the AI engine, at least one network attribute set based on at least the network resources and network threats; determining and assigning, using the AI engine, a weight for each of the at least one network attribute set; generating, using the AI engine, a directed graph based on at least the network attribute set, wherein the directed graph is associated with at least one distributed network; determining, using the AI engine, an internal network threshold based on at least the directed graph; and generating, using the AI engine, an internal distributed network resources allocation based on at least the directed graph and the internal network threshold.

In some embodiments, the computer-implemented method is further configured for: extracting external data from external network data packets received from at least one external distributed network; determining, using the AI engine, external network resources, external network threats, and an external distributed network resources allocation from the external data; generating, using the AI engine, at least one external network attribute set based on at least the external network resources, external network threats, and the external distributed network resources allocation; determining and assigning, using the AI engine, an external weight for each of the at least one external network attribute set; modifying, using the AI engine, the directed graph based on at least the external network attribute set; determining, using the AI engine, an external network threshold based on at least the directed graph and the external distributed network resources allocation; and generating, using the AI engine, a comparison of the internal network threshold and the external network threshold.

In some embodiments, the computer-implemented method is further configured for: generating a user interface on a display, wherein the user interface comprises at least one interactive mixed reality application; rendering an interactive dashboard and the directed graph within the user interface; and receiving control signals from at least one device to navigate the user interface, wherein the control signals modify the interactive dashboard and the directed graph within the user interface.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
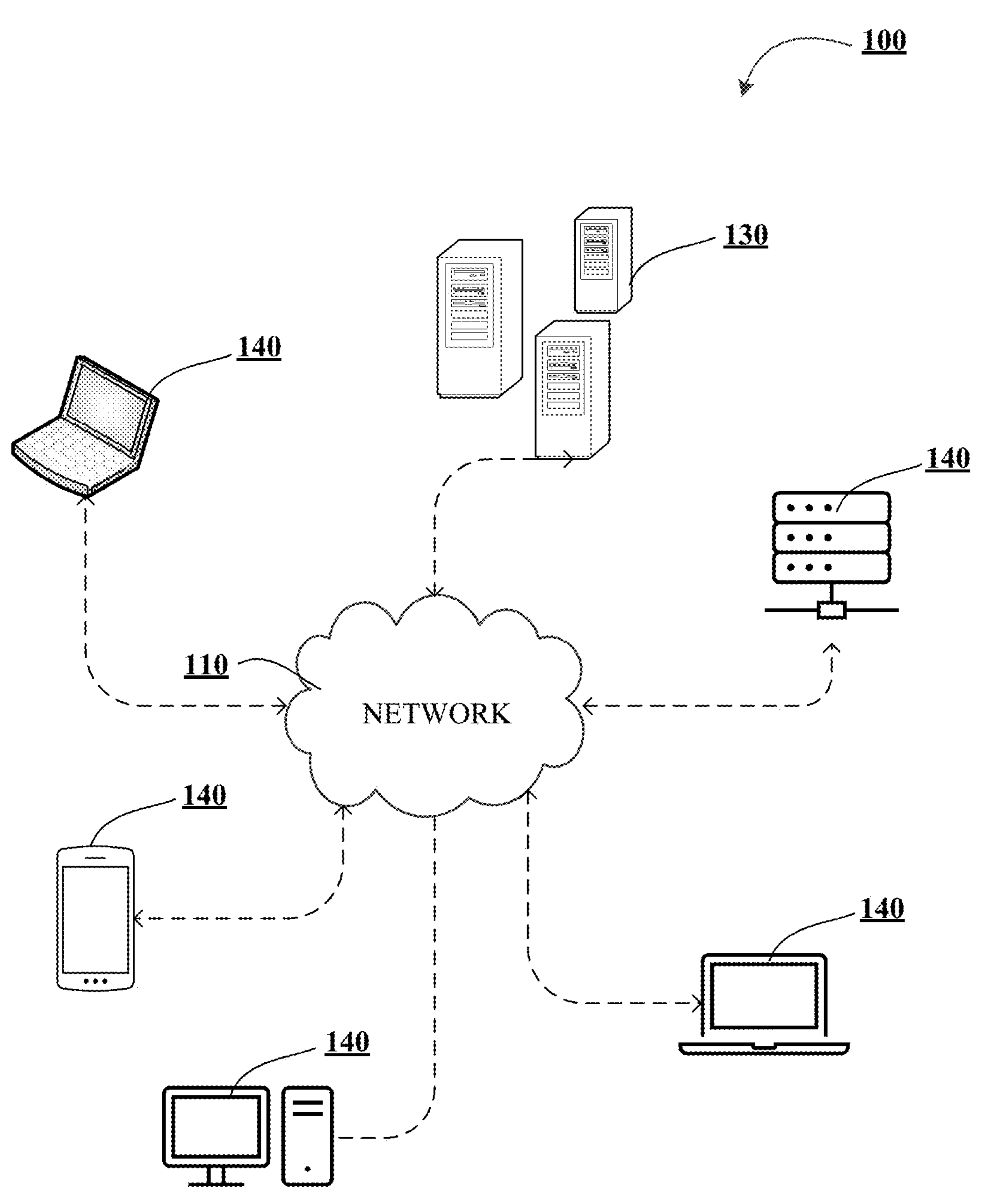
Figure 1B:
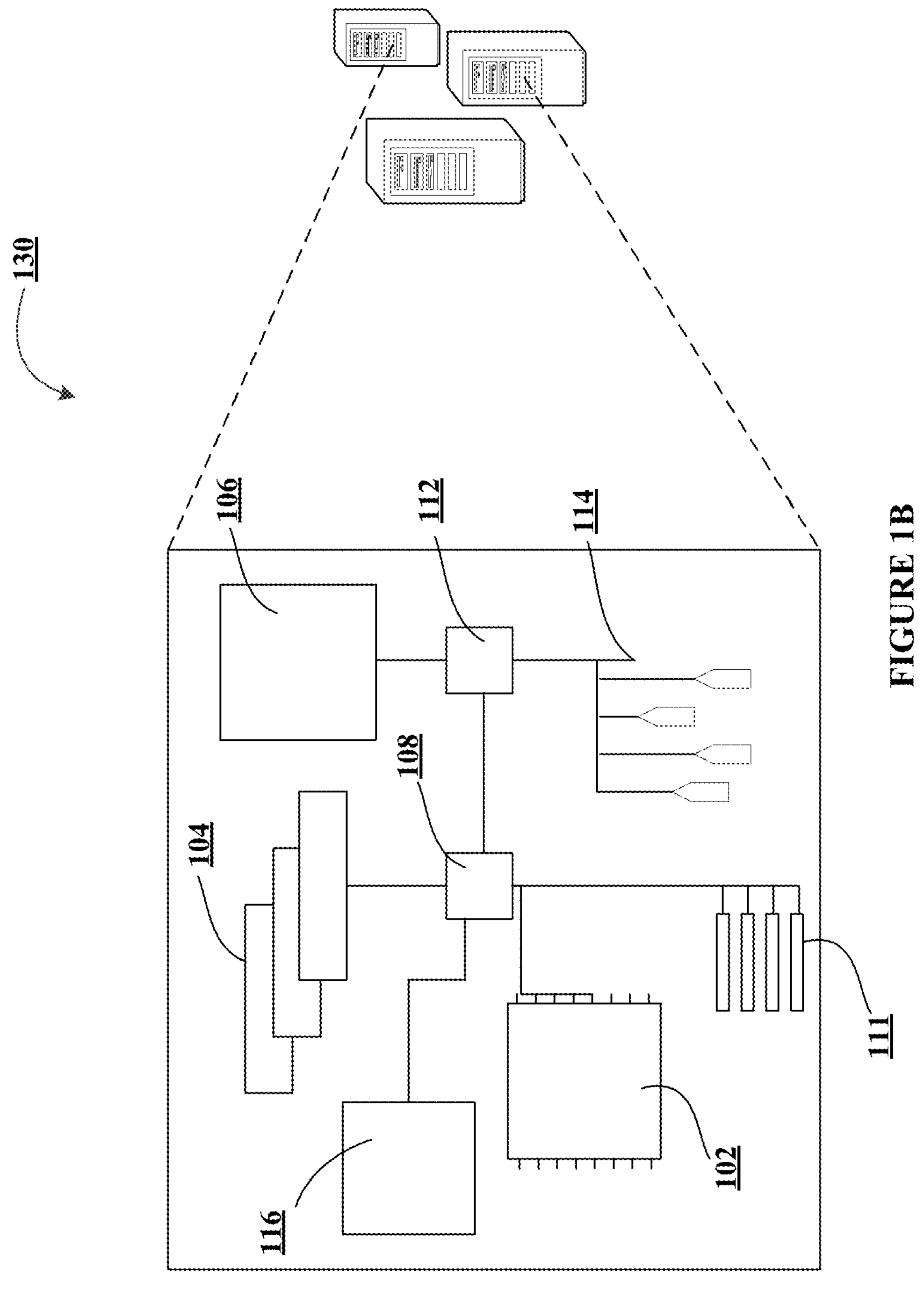
Figure 1C:
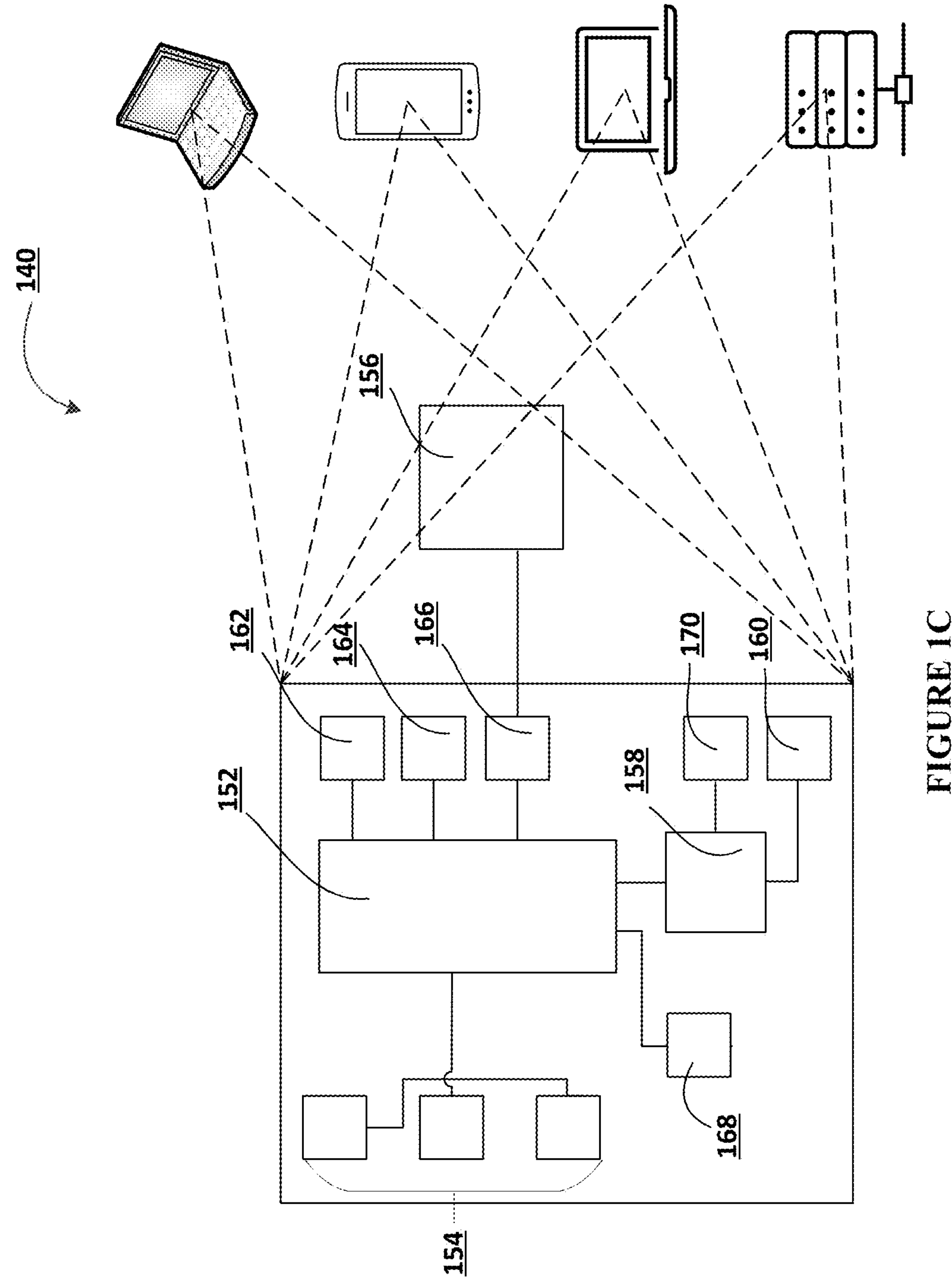
Figure 2:
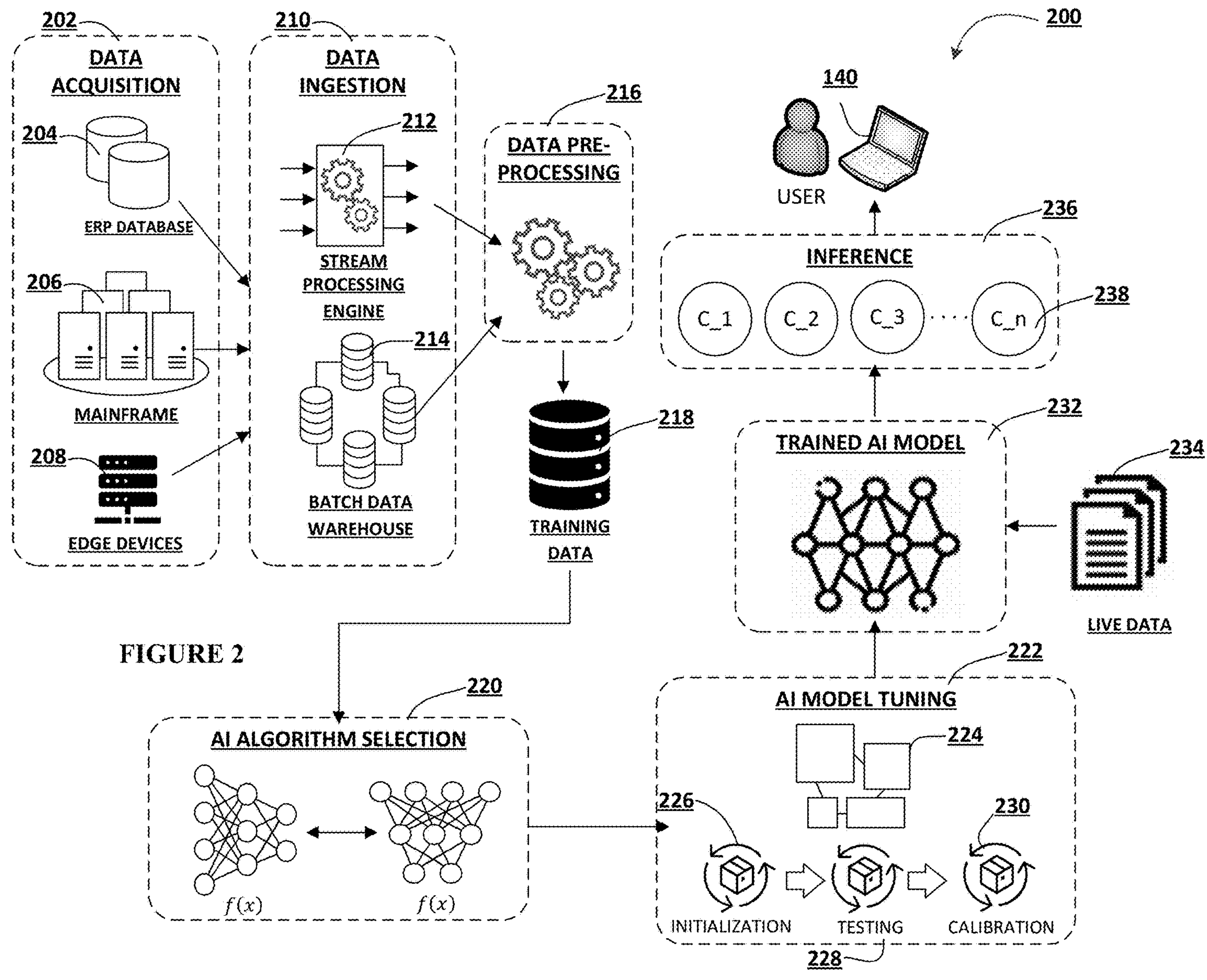
Figure 3:
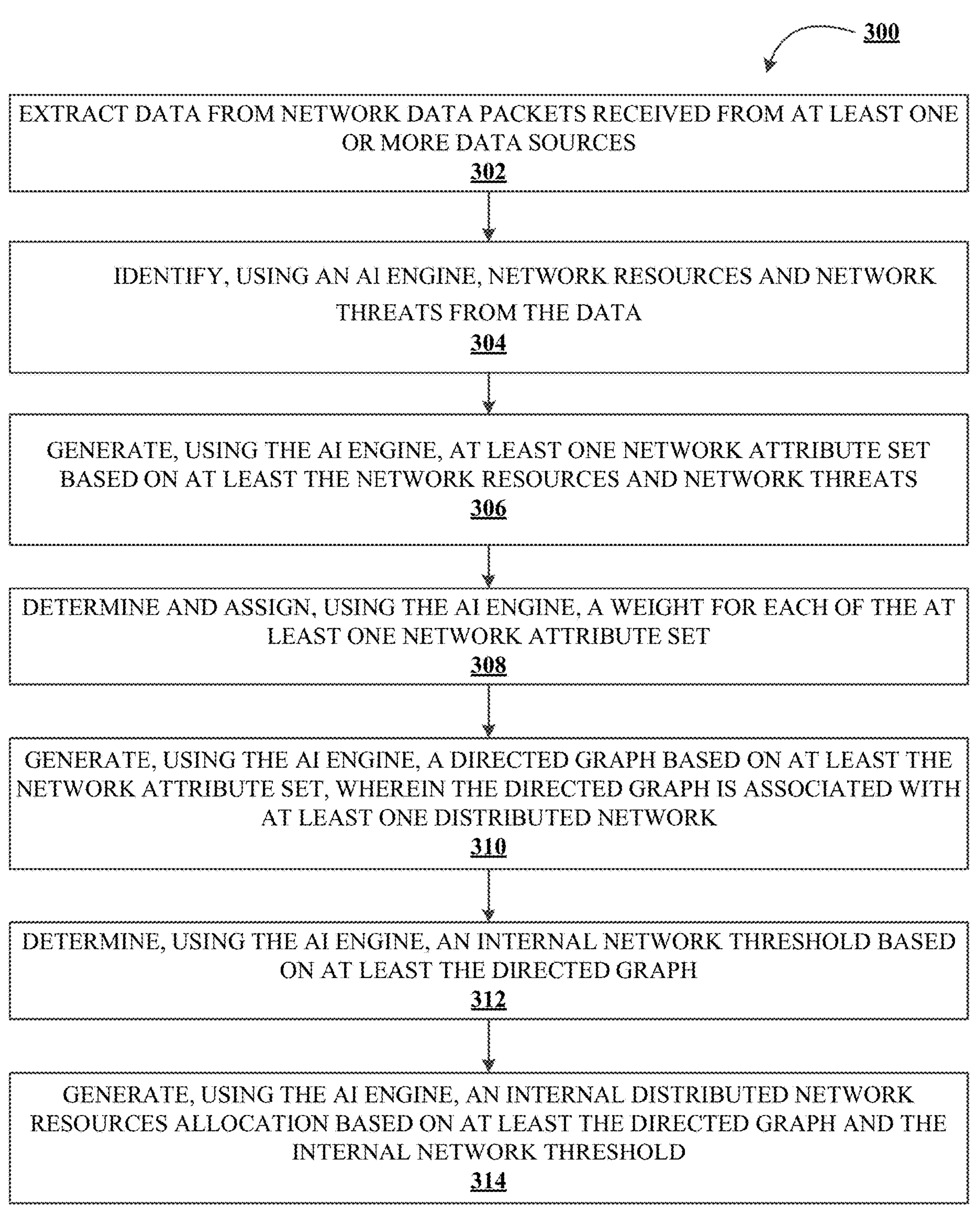

FIGS. 1A-1C illustrates technical components of an exemplary distributed computing environment for network allocation and monitoring engine using AI and dynamic mapping, in accordance with an embodiment of the disclosure;

FIG. 2 illustrates an exemplary AI engine subsystem architecture, in accordance with an embodiment of the disclosure;

FIG. 3 illustrates a process flow 300 for network allocation and monitoring engine using AI and dynamic mapping, in accordance with an embodiment of the disclosure.

Figure 4:
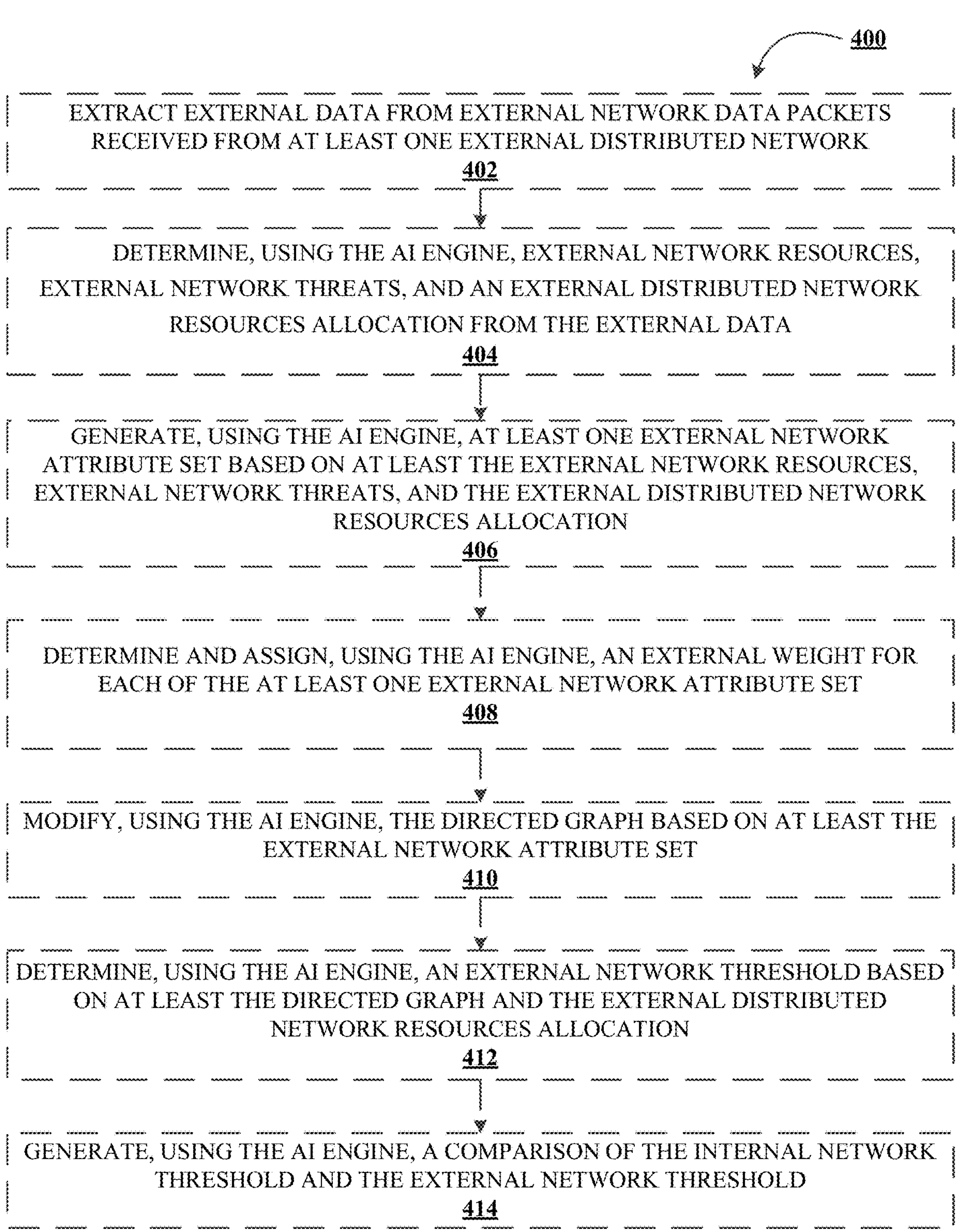

FIG. 4 illustrates a process flow 400 for generating, using the AI engine, a comparison of the internal network threshold and the external network threshold, in accordance with an embodiment of the disclosure.

Figure 5:
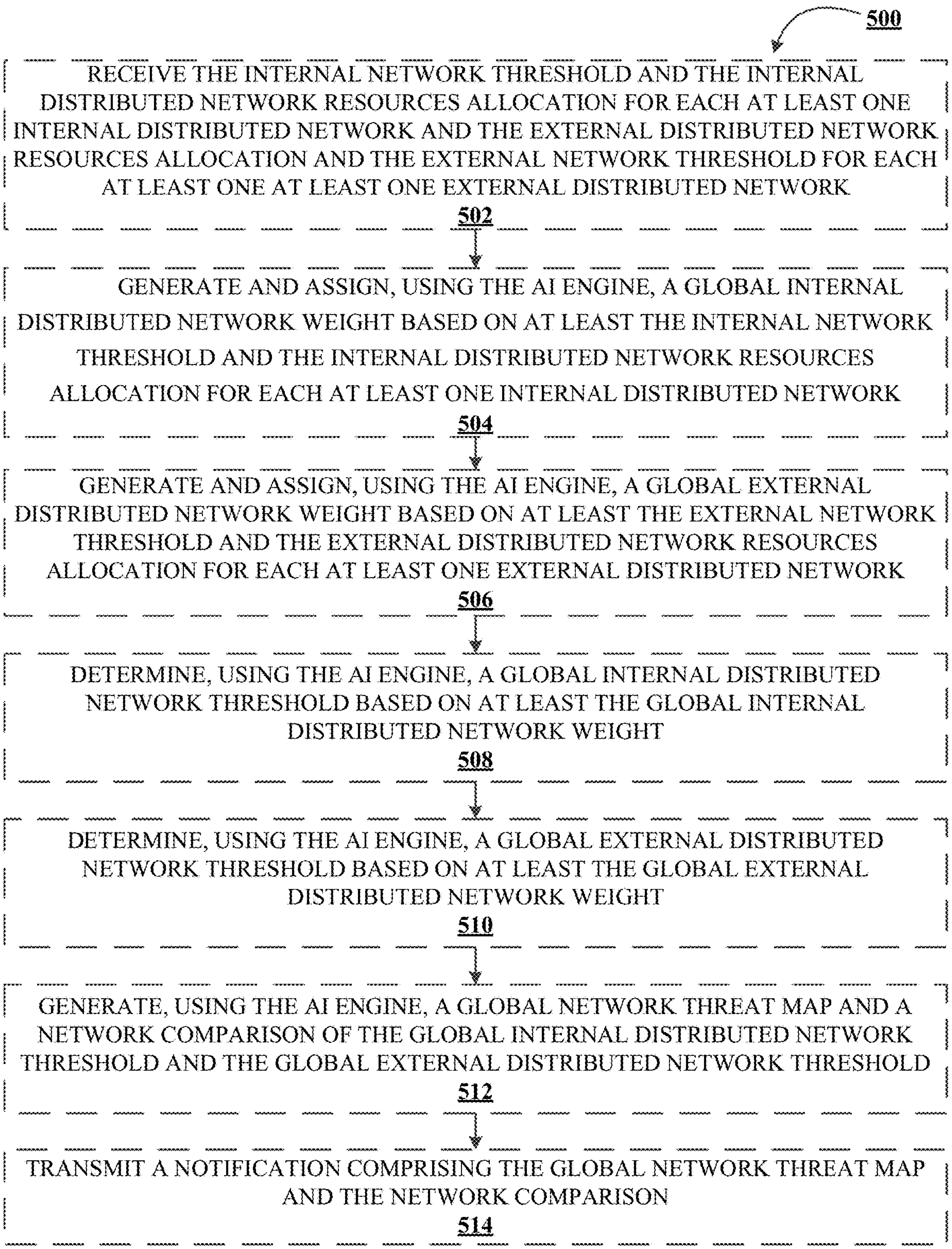

FIG. 5 illustrates a process flow 500 for transmitting a notification comprising the global network threat map and the network comparison, in accordance with an embodiment of the disclosure.

Figure 6:
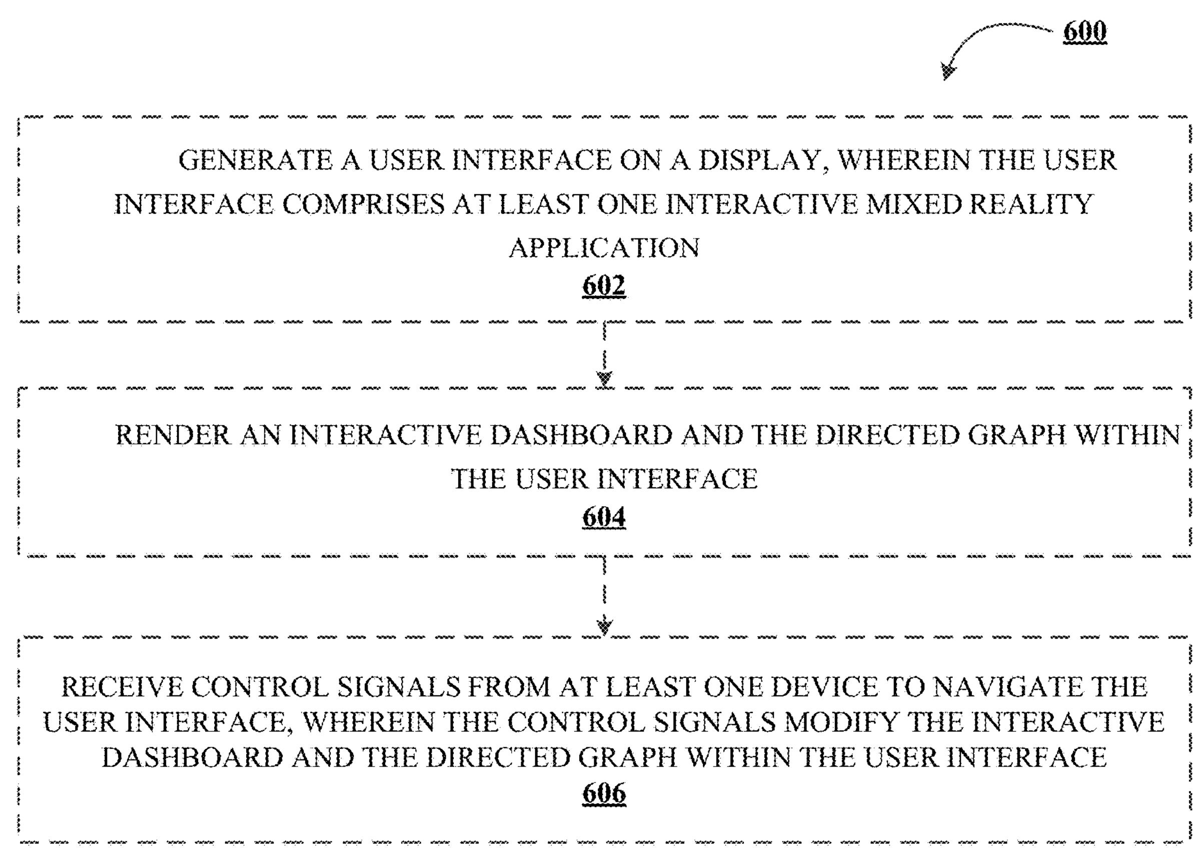

FIG. 6 illustrates a process flow 600 for generating a user interface on a display and receiving control signals from at least one device to navigate the user interface, in accordance with an embodiment of the disclosure.

FIG. 7 illustrates a process flow 700 for rendering a plurality of directed graphs and modifying at least one view of the plurality of directed graphs within the user interface, in accordance with an embodiment of the disclosure.

Figure 8:
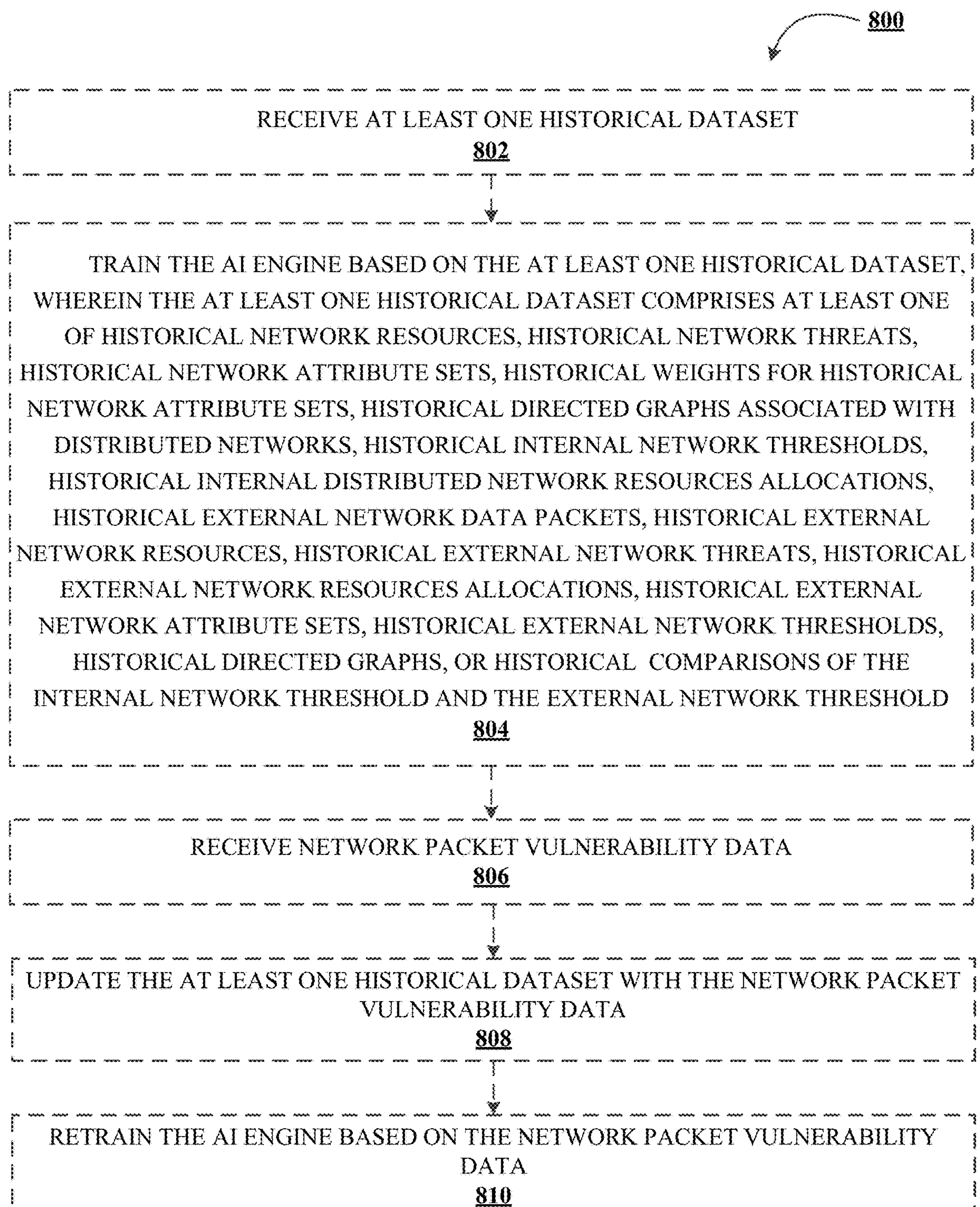

FIG. 8 illustrates a process flow 800 for training and retraining the AI engine, in accordance with an embodiment of the disclosure.

Figure 9:
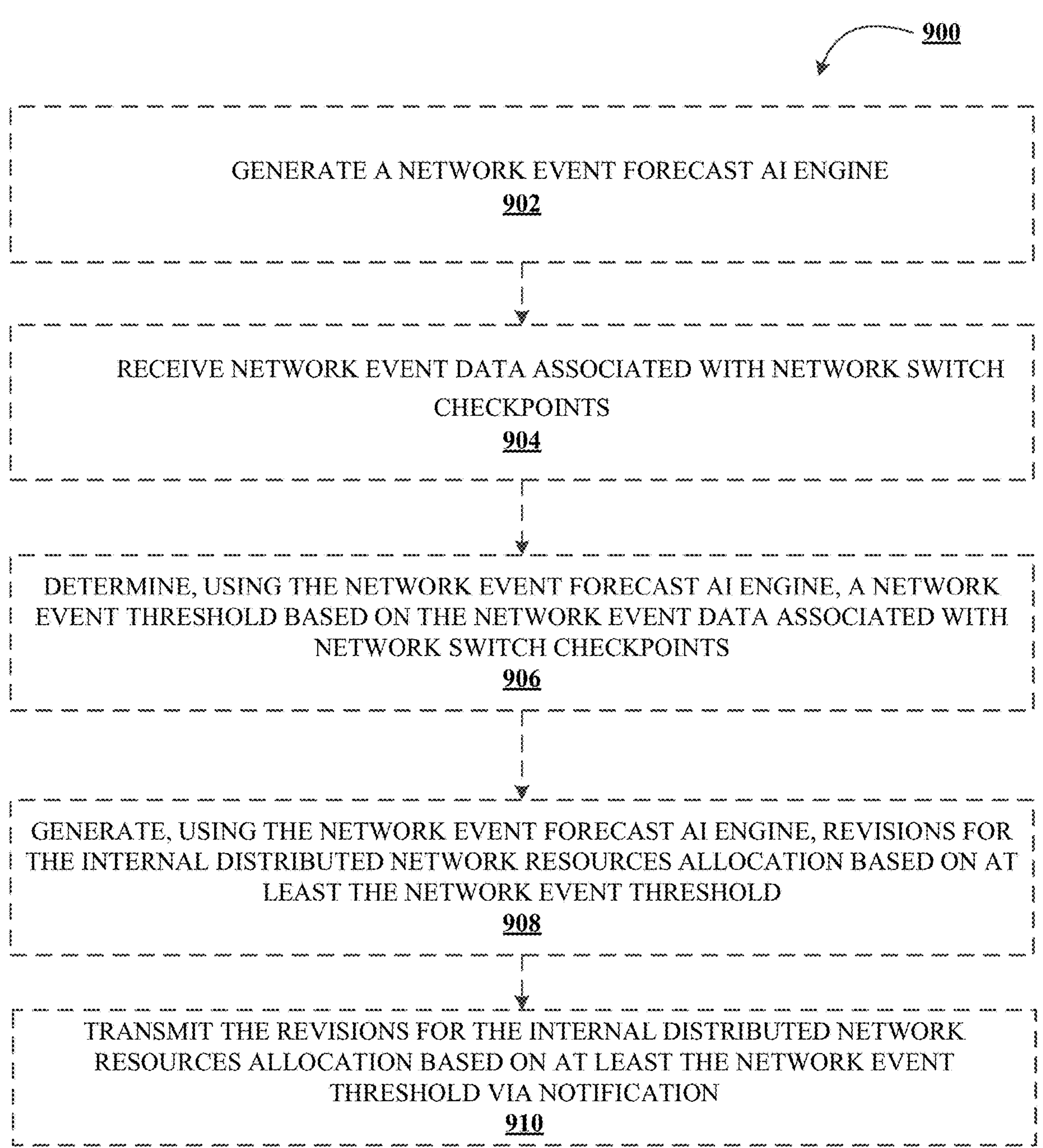

FIG. 9 illustrates a process flow 900 for generating a network event forecast AI engine and transmitting revisions for internal distributed network resources allocation, in accordance with an embodiment of the disclosure.

Figure 10:
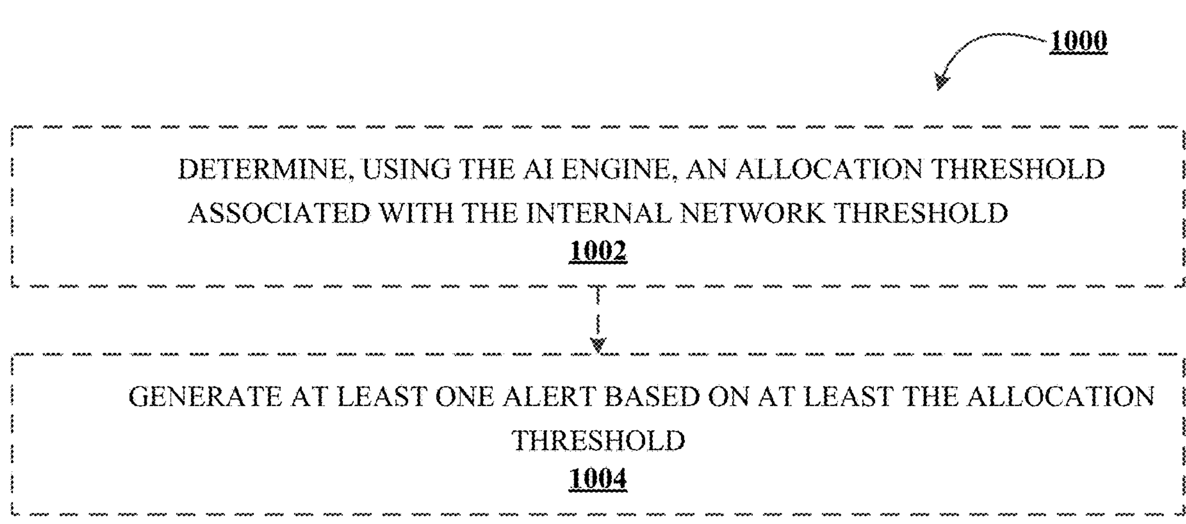

FIG. 10 illustrates a process flow 1000 for determining, using the AI engine, an allocation threshold associated with the internal network threshold and generating an alert, in accordance with an embodiment of the disclosure.

Figure 11:
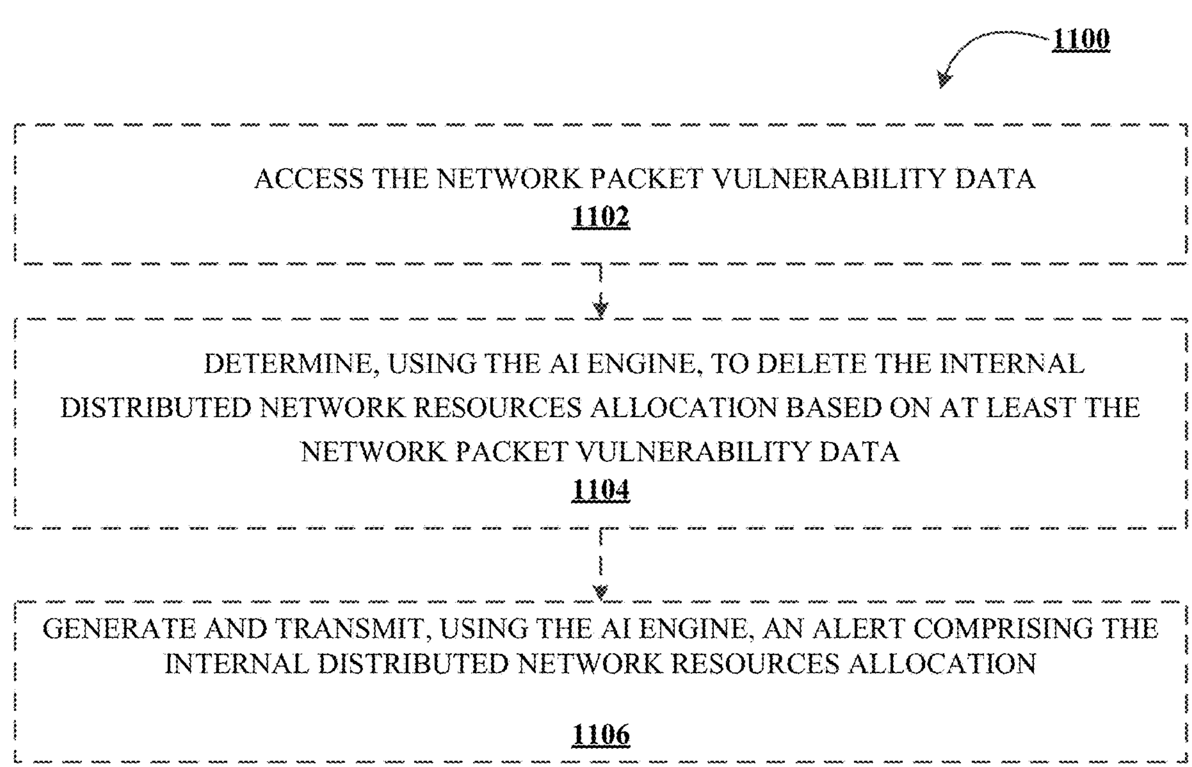

FIG. 11 illustrates a process flow 1100 for generating and transmitting, using the AI engine, an alert comprising the internal distributed network resources allocation, in accordance with an embodiment of the disclosure.

Figure 12:
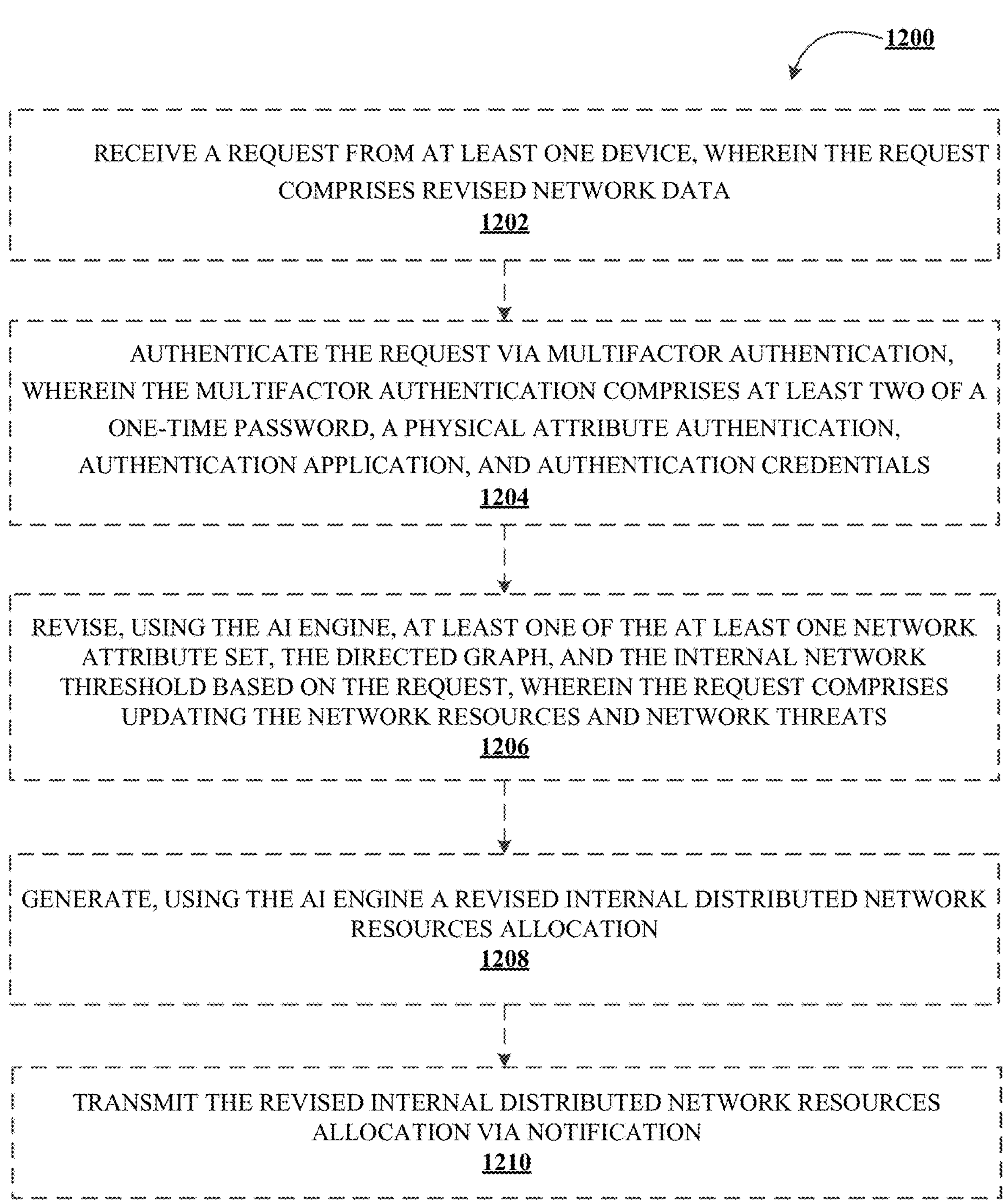

FIG. 12 illustrates a process flow 1200 for generating, using the AI engine a revised internal distributed network resources allocation, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As described in further detail herein, the present disclosure provides a solution to the above-referenced problems in the field of technology by providing network allocation and monitoring engine using artificial intelligence and dynamic mapping, which is designed to autonomously, accurately, efficiently, and at-scale monitor network traffic data, assess network resources and network threats, and determine an internal distributed network resources allocation. The system may receive and extract data from network data packets from at least one or more data sources to identify, using an AI engine, network resources and network threats. In addition, the system generates at least one network attribute set using the AI engine based on at least network resources and network threats. In doing so, the system provides a holistic criteria set, or the at least one network attribute set, for analyzing network threats, network resources, and network conditions. Furthermore, the invention determines and assigns a weight to the at least one network attribute set for facilitating the holistic analysis. The AI engine generates a directed graph based on the at least one network attribute set. In addition, the AI engine determines an internal network threshold based on at least the directed graph. The internal network threshold informs the internal distributed network resources allocation by assessing diverse factors and evaluating network conditions. The AI engine also generates an internal distributed network resources allocation based on at least the directed graph and the internal network threshold.

Accordingly, the present disclosure provides network allocation and monitoring engine using artificial intelligence and dynamic mapping. For instance, network allocation and monitoring require efficient resource utilization, accurate threat monitoring and detection in network traffic, and dynamic responsive actions. Continuously monitoring network activity to determine network allocation requires large resource spend, dynamic determinations of network resource generation requirements, and secure data transmissions. In addition, mapping network resources, network threats, and network resource allocations requires efficient computing utilization, minimized latency requirements, and dynamic graph modeling functionality. The system resolves these challenges by providing an AI engine and dynamic mapping to monitor network data, determine network resources and network threats, and determine allocations of network resources.

What is more, the present disclosure provides a technical solution to a technical problem. As described herein, the technical problem includes network allocation and monitoring engine using AI and dynamic mapping. The technical solution presented herein allows for dynamic, efficient, and autonomous network monitoring, resource allocation determinations, and dynamic mapping. In particular, the network allocation and monitoring engine using AI and dynamic mapping is an improvement over existing solutions to the technical challenges, (i) with fewer steps to achieve the solution, thus reducing the amount of computing resources, such as processing resources, storage resources, network resources, and/or the like, that are being used (e.g., by utilizing an AI engine to monitor network traffic data to generate an efficient internal distributed network resources allocation), (ii) providing a more accurate solution to problem, thus reducing the number of resources required to remedy any errors made due to a less accurate solution (e.g., by utilizing at least one weighted network attribute set for evaluating network threats, network resources, and criteria associated with network resource allocation, providing more diverse criteria and contextual perspectives for the network monitoring and internal distributed network resources allocation), (iii) removing manual input and waste from the implementation of the solution, thus improving speed and efficiency of the process and conserving computing resources (e.g., by utilizing an autonomous AI engine for generating a directed graph for visualizing network resources and network threats), (iv) determining an optimal amount of resources that need to be used to implement the solution, thus reducing network traffic and load on existing computing resources (e.g., by evaluating external network resources and external network threats using an AI engine to determine a global network threat map). Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for network allocation and monitoring engine using artificial intelligence and dynamic mapping 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary AI engine subsystem architecture 200, in accordance with an embodiment of the disclosure. The artificial intelligence subsystem 200 may include a data acquisition engine 202, data ingestion engine 210, data pre-processing engine 216, AI tuning engine 222, and inference engine 236.

The data acquisition engine 202 may identify various internal and/or external data sources to generate, test, and/or integrate new features for training the artificial intelligence model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In artificial intelligence, the quality of data and the useful information that can be derived therefrom directly affects the ability of the artificial intelligence model 224 to learn. The data pre-processing engine 216 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of artificial intelligence algorithm being used, this training data 218 may require further enrichment. For example, in supervised learning, the training data is enriched using one or more meaningful and informative labels to provide context so an artificial intelligence model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI tuning engine 222 may be used to train an artificial intelligence engine 224 using the training data 218 to make predictions or decisions without explicitly being programmed to do so. The artificial intelligence engine 224 represents what was learned by the selected artificial intelligence algorithm 220 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, or the like), unsupervised learning (e.g., using an Apriori algorithm, using K-means clustering), semi-supervised learning, reinforcement learning (e.g., using a Q-learning algorithm, using temporal difference learning), and/or any other suitable artificial intelligence model type. Each of these types of artificial intelligence algorithms can implement any of one or more of a regression algorithm (e.g., ordinary least squares, logistic regression, stepwise regression, multivariate adaptive regression splines, locally estimated scatterplot smoothing, or the like), an instance-based method (e.g., k-nearest neighbor, learning vector quantization, self-organizing map, or the like), a regularization method (e.g., ridge regression, least absolute shrinkage and selection operator, elastic net, or the like), a decision tree learning method (e.g., classification and regression tree, iterative dichotomiser 3, C4.5, chi-squared automatic interaction detection, decision stump, random forest, multivariate adaptive regression splines, gradient boosting machines, or the like), a Bayesian method (e.g., naïve Bayes, averaged one-dependence estimators, Bayesian belief network, or the like), a kernel method (e.g., a support vector machine, a radial basis function, or the like), a clustering method (e.g., k-means clustering, expectation maximization, or the like), an associated rule learning algorithm (e.g., an Apriori algorithm, an Eclat algorithm, or the like), an artificial neural network model (e.g., a Perceptron method, a back-propagation method, a Hopfield network method, a self-organizing map method, a learning vector quantization method, or the like), a deep learning algorithm (e.g., a restricted Boltzmann machine, a deep belief network method, a convolution network method, a stacked auto-encoder method, or the like), a dimensionality reduction method (e.g., principal component analysis, partial least squares regression, Sammon mapping, multidimensional scaling, projection pursuit, or the like), an ensemble method (e.g., boosting, bootstrapped aggregation, AdaBoost, stacked generalization, gradient boosting machine method, random forest method, or the like), and/or the like.

To tune the artificial intelligence model, the ML model tuning engine 222 may repeatedly execute cycles of experimentation 226, testing 228, and tuning 230 to optimize the performance of the artificial intelligence algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained artificial intelligence model 232 is one whose hyperparameters are tuned and model accuracy maximized.

The trained artificial intelligence model 232, similar to any other software application output, can be persisted to storage, file, memory, or application, or looped back into the processing component to be reprocessed. More often, the trained artificial intelligence model 232 is deployed into an existing production environment to make practical business decisions based on live data 234. To this end, the artificial intelligence subsystem 200 uses the inference engine 236 to make such decisions. The type of decision-making may depend upon the type of artificial intelligence algorithm used. For example, artificial intelligence models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, artificial intelligence models that perform regression techniques may use live data 234 to predict or forecast continuous outcomes.

It will be understood that the embodiment of the artificial intelligence subsystem 200 illustrated in FIG. 2 is exemplary and that other embodiments may vary. As another example, in some embodiments, the artificial intelligence subsystem 200 may include more, fewer, or different components.

FIG. 3 illustrates a process flow 300 for network allocation and monitoring engine using artificial intelligence and dynamic mapping, in accordance with an embodiment of the disclosure. In some embodiments, a system (e.g., similar to one or more of the systems described herein with respect to FIGS. 1A-1C) may perform one or more of the steps of process flow 300. For example, a network allocation and monitoring engine using artificial intelligence and dynamic mapping system (e.g., the system 130 described herein with respect to FIG. 1A-1C) may perform the steps of process flow 300. In some embodiments, an AI engine (e.g., such as the AI engine like that described in FIG. 2) may perform some or all of the steps described in process flow 300.

As shown in block 302, the process flow 300 may include the step of extracting data from network data packets received from at least one or more data sources. In some embodiments, the network data packets may transmit via a communication channel, wherein the communication channel comprises encrypted transmissions, communications, and/or the like. In some embodiments, the network data packets may be transmitted across at least one electronic environment, network (e.g., internal network, external network, and/or the like), and/or the like. In some embodiments, the system may use an Extract, Transform, and Load (ETL) process to receive the network data packets from the at least one or more data sources, process the extracted data, and then store the extracted data in an internal data storage repository.

In some embodiments, the network data packets may comprise at least one of network resources, network resource data, network threats, network threat data, technical criteria, and/or the like. In some embodiments, network resources may comprise currency, virtual currency, tokens, digital tokens, virtual tokens associated with physical objects, non-fungible tokens, network transmission catalysts, network resource catalysts, technical skill, and/or the like. According to some embodiments, technical criteria may comprise security requirements (e.g., data security requirements), bandwidth requirements, performance, scalability, compatibility, encryption protocol, network topology, hardware designs, integrated circuits, embedded firmware, AI engine applications, software applications, and/or the like.

In some embodiments, network threat data may comprise factors associated with technical threats, security incidents, data security breaches, network resources associated with an external distributed ledger, malicious actor actions, and/or technical resources associated with an external distributed network (e.g., AI engine applications, software applications, encryption protocol, hardware designs, integrated circuits, embedded firmware, and/or the like). According to some embodiments, network threats may comprise malware, ransomware, security incident, malicious actor unauthorized access, data security breach, and/or external distributed network resources (e.g., technical resources, technical designs, switches, routers, AI engine applications, software applications, encryption protocol, hardware designs, integrated circuits, embedded firmware, and/or the like).

As shown in block 304, the process flow 300 may include the step of identifying, using an AI engine, network resources and network threats from the data. In some embodiments the AI engine may be pretrained to identify network resources and network threats based on at least the data. According to some embodiments, the AI engine may parse the network data using at least one AI engine algorithm (e.g., supervised learning, unsupervised learning, reinforcement learning, and/or semi-supervised learning) to determine whether the data comprises network resources and/or network threats. By way of non-limiting example, and in some embodiments, the AI engine may make a determination that the data comprises a network threat and/or network resource, label the data, transmit a notification comprising the determination, utilize ETL processing to transmit the data to a storage repository location, update network performance analytics associated with network threats and/or network resources (e.g., quantifying network threats and/or network resources), and/or the like.

As shown in block 306, the process flow 300 may include the step of generating, using the AI engine, at least one network attribute set based on at least the network resources and network threats. In some embodiments, the at least one network attribute set may comprise one or more network attributes associated with the network resources and/or network threats. In some embodiments, the at least one network attribute set may comprise technical resources associated with network resources, internal network threats, external network threats (e.g., external network resources, security incidents, data security breaches, technical vulnerabilities, and/or the like), forecast network resources (e.g., forecast of network resource contraction and/or expansion), internal distributed network resources allocations, and/or forecast network threats (e.g., forecast threats to the network, including without limitation external network resources, external network threats, and/or technical vulnerabilities). In some embodiments, the at least one network attribute set may comprise one network attribute, one or more network attributes, and/or a plurality of network attribute sets (e.g., at least two sets of network attributes). The at least one network attribute set may be dynamic (e.g., determined in real-time by the AI engine, user requests, and/or the like as network data continuously monitored and/or received), fixed (e.g., determined by the AI engine, user request, predetermined internal criteria, and/or the like), and/or update via batch processing at periodic intervals during scheduled network data scans, according to some embodiments. In some embodiments, the at least one network attribute set may be based on qualitative data (e.g., text) and/or quantitative data within the data associated with network threats and/or network resources.

As shown in block 308, the process flow 300 may include the step of determining and assigning, using the AI engine, a weight for each of the at least one network attribute set. In some embodiments, the weight may comprise a qualitative descriptor, quantitative value, and/or the like, in some embodiments. In some embodiments, the qualitative descriptor of the weight may comprise a letter grade (e.g., A to F), a written description (e.g., high, medium, low, and/or the like), and/or the like.

In some embodiments, the quantitative value of the weight may comprise a numerical rating (e.g., whole number, decimals, and/or the like) on a spectrum (e.g., from zero to one hundred), wherein smaller numerical ratings may be associated with lower network resource confidence levels and higher numerical ratings may be associated with higher network resource confidence levels. According to some embodiments, a network resource confidence level may comprise a threshold associated with network resource allocation, network resource quantity, and/or the like. In some embodiments, the quantitative value of the weight may comprise a percentage, wherein a lower percentage is associated with a lower network resource confidence level and a higher percentage is associated with a higher network resource confidence level. In a non-limiting example, and in some embodiments, the AI engine may determine and assign the weight to the at least one network attribute set continuously, retrieve any non-weighted network attribute set, and/or determine and assign a weight to any non-weighted network attribute set. In some embodiments, the AI engine may continuously update the weight of the at least one network attribute set based on continuously monitored and/or received data, a request by a user to update the weight, a system-generated request to modify the weight, based on a set interval schedule, and/or the like.

A weighted at least one network attribute set may provide insight into all relevant factors that may influence network resource allocation, wherein the factors may comprise internal factors, external factors, and/or a combination of internal factors and external factors. In such configurations, this may provide guidance into determining how to allocate network resources based on status and condition of internal networks and external networks. By way of non-limiting example, and in some embodiments, based on the weight of at least one network attribute set, the AI engine may determine how to allocate network resources (e.g., allocate all network resources to a single network device, allocate all network resources amongst a plurality of network devices, and/or the like).

As shown in block 310, the process flow 300 may include the step of generating, using the AI engine, a directed graph based on at least the network attribute set, wherein the directed graph is associated with at least one distributed network. In some embodiments, the directed graph may comprise nodes associated with network resources and vectors associated with network threats, wherein the at least one distributed network comprises at least network resources and/or network threats. In some embodiments, the directed graph may indicate the relationships between the at least one network attribute set, network threats, and/or network resources. According to some embodiments, the relationships may comprise vectors indicating relationships between each node of the directed graph, wherein each node is associated with the at least one network attribute set, network threats, and/or network resources. In some embodiments, the directed graph may comprise directed paths amongst nodes and edges (e.g., directional and/or bidirectional), wherein the nodes comprise network switch checkpoints (e.g., decision nodes within the network) and the edges comprise network paths associated with relationships between the nodes. According to some embodiments of the disclosure, the network switch checkpoint may comprise a decision node wherein the AI engine determines network resource allocations prior to continuing through the directed path. In some embodiments, the directed paths may comprise multi-directional edges to facilitate multi-directional transmissions along the directed path to various network switch checkpoints.

In some embodiments, the vectors may comprise network resource catalysts and/or network threat catalysts, which may impact the diminution and/or generation of additional network resources and/or network threats within the at least one distributed network. By way of non-limiting example, a network resource catalyst may increase generation of additional network resources, decrease network threats, and/or prevent generation of additional network threats, according to some embodiments. In an additional non-limiting example, and in some embodiments, a network threat catalyst may prevent generation of additional network resources, decrease network resources, and/or increase generation of network threats.

In some embodiments, the directed graph map may comprise a heat map depicting network switch checkpoints, nodes, edges, network resources, network threats, network resource catalysts, and/or network threat catalysts. The heat map may comprise a network diagram and/or network topology map with color-coding, wherein the color-coding may comprise systemized coloring for network threats, network resources, network threat vectors, network resource vectors, and/or the like, according to some embodiments. The color-coding of the heat map may visually depict severity or impact of network resources, network threats, network resource catalysts, and/or network threat catalysts, such as at least one red color representing network threats and/or network threat catalysts; at least one yellow as intermediate and/or indeterminate network resources, network threats, network resource catalysts, and/or network threat catalysts; and/or at least one green as network resources and/or network resource catalysts, according to some embodiments. In some embodiments the AI engine may organize the heat map by color and/or allow a user to filter by color to view certain portions of the heat map, such as by an associated color (e.g., red, yellow, green, and/or the like).

As shown in block 312, the process flow 300 may include the step of determining, using the AI engine, an internal network threshold based on at least the directed graph. In some embodiments, the internal network threshold may comprise a cumulative network threat assessment and/or network resource assessment associated with and/or based on the directed graph, at least one network attribute set, network resources, and/or network threats. The internal network threshold may comprise a cumulative assessment based on all weighted network attribute sets, wherein the cumulative assessment is a confidence threshold associated with all known network resources and forecast network resources, network resource catalysts, network threats, and/or network threat catalysts. In some embodiments, the internal network threshold may comprise a minimum confidence threshold for allocation of network resources at a particular network switch checkpoint, node, and/or vertex within the directed graph. By way of non-limiting example, and in some embodiments, if the known network threats and forecast network threats exceed the known network resources and forecast network resources, then the AI engine may determine that the internal network threshold indicates to withhold additional network resource allocation at the particular network switch checkpoint, node, and/or vertex within the directed graph and/or the AI engine may determine to trigger remediation measures to contain a vulnerability associated with the known network threats and forecast network threats. In an additional non-limiting example, and in some embodiments, the AI engine may determine that the forecast network resources are associated with a low internal network threshold and may determine to withhold additional network resource allocation at the particular network switch checkpoint, node, and/or vertex within the directed graph and/or the AI engine may determine to trigger remediation measures to minimize network resource waste.

As shown in block 314, the process flow 300 may include the step of generating, using the AI engine, an internal distributed network resources allocation based on at least the directed graph and the internal network threshold. The internal distributed network resources allocation may comprise an assignment, commitment to transfer, and/or transfer of internal distributed network resources, in some embodiments. According to some embodiments of the disclosure, the AI engine may trigger and execute a network resource transfer based on at least the internal distributed network resources allocation, directed graph, internal network threshold, network resources, forecast network resources, network resource catalysts, network threats, forecast network threats, network threat catalysts, and/or the like. The AI engine may generate the internal distributed network resources allocation for each network switch checkpoint, node in the directed graph, and/or the like. In some embodiments, the AI engine may transmit an alert comprising the internal distributed network resources allocation and/or a confirmation message indicating a successful network resource transfer.

FIG. 4 illustrates a process flow 400 for generating, using the AI engine, a comparison of the internal network threshold and the external network threshold, in accordance with an embodiment of the disclosure. In some embodiments, a system (e.g., similar to one or more of the systems described herein with respect to FIGS. 1A-1C) may perform one or more of the steps of process flow 400. For example, a network allocation and monitoring engine using artificial intelligence and dynamic mapping system (e.g., the system 130 described herein with respect to FIG. 1A-1C) may perform the steps of process flow 400. In some embodiments, an AI engine (e.g., such as the AI engine like that described in FIG. 2) may perform some or all of the steps described in process flow 400.

As shown in block 402, the process flow 400 may include the step of extracting external data from external network data packets received from at least one external distributed network. In some embodiments, the external network data packets may transmit via an external communication channel, wherein the external communication channel comprises encrypted transmissions, communications, and/or the like. In some embodiments, the external network data packets may be transmitted across at least one electronic environment, network (e.g., internal network, external network, and/or the like), and/or the like. In some embodiments, the system may use an ETL process to receive the external network data packets from the at least one or more external data sources, process the extracted data, and then store the extracted data in an external data storage repository.

In some embodiments, the external network data packets may comprise at least one of external network resources, external network resource data, external network threats, external network threat data, external technical criteria, and/or the like. In some embodiments, the external network resources may comprise currency, virtual currency, tokens, digital tokens, virtual tokens associated with physical objects, non-fungible tokens, network transmission catalysts, network resource catalysts, technical skill, and/or the like. According to some embodiments, external technical criteria may comprise security requirements (e.g., data security requirements), bandwidth requirements, performance, scalability, compatibility, encryption protocol, network topology, hardware designs, integrated circuits, embedded firmware, AI engine applications, software applications, and/or the like.

In some embodiments, external network threat data may comprise factors associated with technical threats, security incidents, data security breaches, network resources associated with an external distributed ledger, malicious actor actions, and/or technical resources associated with an external distributed network (e.g., enhanced AI engine applications, software applications, encryption protocol, hardware designs, integrated circuits, embedded firmware, and/or the like in comparison to technical resources associated with the internal distributed network). According to some embodiments, external network threats may comprise malware, ransomware, security incident, malicious actor unauthorized access, data security breach, and/or external distributed network resources (e.g., technical resources, technical designs, switches, routers, AI engine applications, software applications, encryption protocol, hardware designs, integrated circuits, embedded firmware, and/or the like).

As shown in block 404, the process flow 400 may include the step of determining, using the AI engine, external network resources, external network threats, and an external distributed network resources allocation from the external data. In some embodiments the AI engine may be pretrained to identify external network resources and external network threats based on at least the data, trained continuously as external data packets are received, trained based on periodic intervals, and/or the like. According to some embodiments, the AI engine may parse the external data using at least one external AI engine algorithm (e.g., supervised learning, unsupervised learning, reinforcement learning, learning, and/or semi-supervised learning) to determine whether the data comprise external network resources, external network threats, external distributed network resources allocation, and/or the like. By way of non-limiting example, and in some embodiments, the AI engine may make a determination that the external data comprises an external network threat, external network resource, label the external, transmit a notification comprising the determination, utilize ETL processing to transmit the external data to a storage repository location, update statistics associated with external network threats, external network resources, external distributed network resources allocation, and/or the like (e.g., quantifying a sum of external network threats, external network resources, and/or external distributed network resources allocation). In some embodiments, the AI engine may determine the external distributed network resources allocation based on external data, scraping external data sources, forecasts from an AI engine algorithm, and/or the like. The external distributed network resources allocation may comprise an assignment, commitment to transfer, and/or transfer of external network sources, in some embodiments.

As shown in block 406, the process flow 400 may include the step of generating, using the AI engine, at least one external network attribute set based on at least the external network resources, external network threats, and the external distributed network resources allocation. In some embodiments, the at least one external network attribute set may comprise one or more external network attributes associated with the external network resources, external distributed network resources allocation, and/or external network threats. In some embodiments, the at least one external network attribute set may comprise technical resources associated with external network resources, external network threats (e.g., external network resources, security incidents, data security breaches, technical vulnerabilities, and/or the like), forecast external network resources (e.g., forecast of external network resource contraction and/or expansion), external network resource allocations, and/or forecast external network threats (e.g., forecast threats to the external network, known external network threats, and/or technical vulnerabilities).

In some embodiments, the at least one external network attribute set may comprise one external network attribute, one or more external network attributes, and/or a plurality of external network attribute sets (e.g., at least two sets of external network attributes). The at least one external network attribute set may be dynamic (e.g., determined in real-time by the AI engine, user requests, and/or the like as external network data continuously monitored and/or received), fixed (e.g., determined by the AI engine, user request, predetermined external criteria, and/or the like), and/or update via batch processing at periodic intervals during scheduled external network data scans, according to some embodiments. In some embodiments, the at least one external network attribute set may be based on qualitative data (e.g., text) and/or quantitative data within the external data associated with network threats, external distributed network resources allocation, and/or network resources.

As shown in block 408, the process flow 400 may include the step of determining and assigning, using the AI engine, an external weight for each of the at least one external network attribute set. In some embodiments, the external weight may comprise a qualitative descriptor, quantitative value, and/or the like, in some embodiments. In some embodiments, the qualitative descriptor of the external weight may comprise a letter grade (e.g., A to F), a written description (e.g., high, medium, low, and/or the like), and/or the like.

In some embodiments, the quantitative value of the external weight may comprise a numerical rating (e.g., whole number, decimals, and/or the like) on a spectrum (e.g., from zero to one hundred), wherein smaller numerical ratings may be associated with lower external network resource confidence levels and higher numerical ratings may be associated with higher external network resource confidence levels. According to some embodiments, an external network resource confidence level may comprise a threshold associated with external network resource allocation, external network resource quantity, and/or the like. In some embodiments, the quantitative value of the external weight may comprise a percentage, wherein a lower percentage is associated with a lower external network resource confidence level and a higher percentage is associated with a higher external network resource confidence level. In a non-limiting example, and in some embodiments, the AI engine may determine and assign the external weight to the at least one external network attribute set continuously, retrieve any non-weighted external network attribute set, and determine and assign an external weight to any non-weighted external network attribute set. In some embodiments, the AI engine may continuously update the external weight of the at least one external network attribute set based on continuously monitored and/or received external data, a request by a user to update the external weight, a system-generated request to modify the external weight, based on a set interval schedule, and/or the like.

As shown in block 410, the process flow 400 may include the step of modifying, using the AI engine, the directed graph based on at least the external network attribute set. In some embodiments, modifying the directed graph comprises graphing external nodes and external edges associated with the at least the external network attribute set, external resources, external threats, and/or the like within a directed graph interface, wherein the directed graph interface comprises all directed graphs generated by the AI engine (e.g., the directed graph, modified directed graphs, and/or the like). In some embodiments, the directed graph interface depicts external network resources and external network threats associated with a given node and given edge of the directed graph, juxtaposed with network resources and network threats associated with the given node and given edge of the directed graph. In such configurations, the directed graph interface provides for a visual comparison of network resources, network threats, external network resources, and/or external network threats.

As shown in block 412, the process flow 400 may include the step of determining, using the AI engine, an external network threshold based on at least the directed graph and the external distributed network resources allocation. In some embodiments, the external network threshold may comprise a cumulative external network threat assessment and/or external network resource assessment associated with and/or based on the directed graph, at least one external network attribute set, external network resources, and/or external network threats. The external network threshold may comprise an external cumulative assessment based on all weighted external network attribute sets, wherein the external cumulative assessment is an external confidence threshold associated with all known external network resources and forecast external network resources, external network resource catalysts, external network threats, and/or external network threat catalysts. In some embodiments, the external network threshold may comprise a minimum confidence threshold for allocation of external network resources at a particular node and/or vertex within the directed graph. By way of non-limiting example, and in some embodiments, if the external known network threats and forecast external network threats exceed the known external network resources and forecast external network resources, then the AI engine may determine that the external network threshold indicates to withhold additional external network resource allocation at the particular node and/or vertex within the directed graph and/or the AI engine may determine that an external network administrator may trigger remediation measures to contain an external vulnerability associated with the known external network threats and forecast external network threats.

As shown in block 414, the process flow 400 may include the step of generating, using the AI engine, a comparison of the internal network threshold and the external network threshold. In some embodiments, the comparison may comprise a quantitative analysis of the internal network threshold and the external network threshold. By way of non-limiting example, and in some embodiments, the AI engine may determine that the internal network threshold is associated with a higher value and the external network threshold is associated with a lower value. In such configurations, the AI engine may determine that the internal network threshold exceeds the external network threshold and may transmit a notification comprising the determination. In some embodiments, the AI engine may determine that the AI engine may determine that the internal network threshold is equal to and/or fails to exceed the external network threshold and may transmit a notification comprising the determination. According to some embodiments, the AI engine may generate network resource allocation recommendations based on at least the comparison of the internal network threshold and the external network threshold and transmit a notification comprising the network resource allocation recommendations. In some embodiments the comparison of the internal network threshold and the external network threshold may comprise a graphical comparison within the directed graph interface indicating the comparison based on at least the nodes and/or edges within the directed graph.

FIG. 5 illustrates a process flow 500 for transmitting a notification comprising the global network threat map and the network comparison, in accordance with an embodiment of the disclosure. In some embodiments, a system (e.g., similar to one or more of the systems described herein with respect to FIGS. 1A-1C) may perform one or more of the steps of process flow 500. For example, a network allocation and monitoring engine using artificial intelligence and dynamic mapping system (e.g., the system 130 described herein with respect to FIG. 1A-1C) may perform the steps of process flow 500. In some embodiments, an AI engine (e.g., such as the AI engine like that described in FIG. 2) may perform some or all of the steps described in process flow 500.

As shown in block 502, the process flow 500 may include the step of receiving the internal network threshold and the internal distributed network resources allocation for each at least one internal distributed network and the external distributed network resources allocation and the external network threshold for each at least one at least one external distributed network. In some embodiments, the AI engine may generate and execute an ETL process to receive the internal network threshold and the internal distributed network resources allocation for each at least one internal distributed network and the external distributed network resources allocation and the external network threshold for each at least one at least one external distributed network.

As shown in block 504, the process flow 500 may include the step of generating and assigning, using the AI engine, a global internal distributed network weight based on at least the internal network threshold and the internal distributed network resources allocation for each at least one internal distributed network. In some embodiments, the AI engine may generate and assign multiple global internal distributed network weights, wherein each global internal distributed network weight is associated with the internal network threshold and/or the internal distributed network resources allocation of each internal distributed network.

In some embodiments, the global internal distributed network weight may comprise a qualitative descriptor, quantitative value, and/or the like, in some embodiments. In some embodiments, the qualitative descriptor of the global internal distributed network weight may comprise a letter grade (e.g., A to F), a written description (e.g., high, medium, low, and/or the like), and/or the like. In some embodiments, the quantitative value of the global internal distributed network weight may comprise a numerical rating (e.g., whole number, decimals, and/or the like) on a spectrum (e.g., from zero to one hundred), wherein smaller numerical ratings may be associated with lower global internal distributed network weights and higher numerical ratings may be associated with higher global internal distributed network weights. In some embodiments, the quantitative value of the global internal distributed network weight may comprise a percentage, wherein a lower percentage is associated with a lower global internal distributed network weight and a higher percentage is associated with a higher global internal distributed network weight. In some embodiments, the AI engine may continuously update the global internal distributed network weight dynamically based on continuously monitored and/or received data, a request by a user to update the global internal distributed network weight, a system-generated request to modify the global internal distributed network weight, based on a set interval schedule, and/or the like.

As shown in block 506, the process flow 500 may include the step of generating and assigning, using the AI engine, a global external distributed network weight based on at least the external network threshold and the external distributed network resources allocation for each at least one external distributed network. In some embodiments, the global external distributed network weight may comprise a qualitative descriptor, quantitative value, and/or the like, in some embodiments. In some embodiments, the qualitative descriptor of the global external distributed network weight may comprise a letter grade (e.g., A to F), a written description (e.g., high, medium, low, and/or the like), and/or the like. In some embodiments, the quantitative value of the global external distributed network weight may comprise a numerical rating (e.g., whole number, decimals, and/or the like) on a spectrum (e.g., from zero to one hundred), wherein smaller numerical ratings may be associated with lower global external distributed network weights and higher numerical ratings may be associated with higher global external distributed network weights. In some embodiments, the quantitative value of the global external distributed network weight may comprise a percentage, wherein a lower percentage is associated with a lower global external distributed network weight and a higher percentage is associated with a higher global external distributed network weight. In some embodiments, the AI engine may continuously update the global external distributed network weight dynamically based on continuously monitored and/or received data, a request by a user to update the global external distributed network weight, a system-generated request to modify the global external distributed network weight, based on a set interval schedule, and/or the like.

In some embodiments, the global internal distributed network weight may comprise a cumulative weight of at least one network threat assessment and/or network resource assessment associated with and/or based on each internal distributed network, directed graph, network attribute set, network resources, network resource catalysts, network threat catalysts, and/or network threats. The global internal distributed network weight may comprise a cumulative assessment based on all weighted network attribute sets, wherein the cumulative assessment is a confidence threshold associated with all network resources and forecast network resources, network resource catalysts, network threats, forecast network threats, and/or network threat catalysts, according to some embodiments. In some embodiments, the AI engine may determine at least one global internal distributed network attribute set, which may comprise a cumulative internal distributed network attribute set based at least on one or more network attribute sets, internal distributed networks, directed graphs, network resources, network resource catalysts, network threat catalysts, and/or network threats. In such configurations, and in some embodiments, the AI engine may determine and assign a weight to the at least one global internal distributed network attribute set. According to some embodiments, the AI engine may determine and assign a plurality of weights associated with at least the internal distributed network, directed graph, network attribute set, network resources, network resource catalysts, network threat catalysts, and/or network threats.

As shown in block 508, the process flow 500 may include the step of determining, using the AI engine, a global internal distributed network threshold based on at least the global internal distributed network weight. In some embodiments, the global internal distributed network threshold may comprise a cumulative threshold associated with each internal distributed network, directed graph, internal network threshold, and/or the like. According to some embodiments, the global internal distributed network threshold may be updated dynamically continuously by the AI engine, by request received from one or more user devices, and/or via scheduled intervals. In some embodiments, the global internal distributed network threshold may comprise a minimum confidence threshold for allocation of network resources at a particular one or more directed graphs. By way of non-limiting example, and in some embodiments, if the known network threats and forecast network threats exceed the known network resources and forecast network resources, then the AI engine may determine that the global internal distributed network threshold indicates to withhold additional network resource allocation at the particular or more directed graphs and/or the AI engine may determine to trigger remediation measures to contain a vulnerability associated with the known network threats and forecast network threats. In an additional non-limiting example, and in some embodiments, the AI engine may determine that forecast network resources are associated with a low global internal distributed network threshold and may determine to withhold additional network resource allocation at the particular or more directed graphs and/or the AI engine may determine to trigger remediation measures to minimize network resource waste. By actively determining the global internal distributed network threshold and monitoring network conditions across one or more internal distributed networks, the AI engine reduces waste of network resource and/or minimizes malicious actions from network threats.

As shown in block 510, the process flow 500 may include the step of determining, using the AI engine, a global external distributed network threshold based on at least the global external distributed network weight. In some embodiments, the global external distributed network threshold may comprise a cumulative threshold associated with each external distributed network, external directed graph, external network threshold, and/or the like. According to some embodiments, the global external distributed network threshold may be updated dynamically continuously by the AI engine, by request received from one or more user devices, and/or via scheduled intervals.

As shown in block 512, the process flow 500 may include the step of generating, using the AI engine, a global network threat map and a network comparison of the global internal distributed network threshold and the global external distributed network threshold. In some embodiments, the global network threat map may comprise a directed graph comprising the plurality of directed graphs associated with the global internal distributed network threshold and the plurality of directed graphs associated with the global external distributed network threshold. According to some embodiments, the global network threat map may comprise a network topology map of the global internal distributed network threshold and the global external distributed network threshold, wherein the network topology map may be associated with internal network directed paths, internal network directed graphs (including without limitation nodes, vectors, network switch checkpoints, and/or the like), external network directed paths, external network directed graphs (including without limitation nodes, vectors, network switch checkpoints, and/or the like), and/or the like, according to some embodiments. The global network threat map may be displayed via the directed graph interface, in some embodiments. In some embodiments, the global network threat map may comprise a color-coded heat map, wherein the color-coded heat map may visually depict severity of each threat associated with each internal distributed network, directed graph, and/or the like (e.g., red as most severe threats, yellow as intermediately severe threats, and/or green as low and/or no severe threats). According to some embodiments of the disclosure, the AI global network threat map may be organized by severity level and/or filter threats by severity level (e.g. an associated color, including without limitation red, yellow, and/or green) based on a priority ranking and/or filtering determined by the AI engine and/or network device.

In some embodiments, the network comparison may comprise a quantitative analysis of the global internal distributed network threshold and the global external distributed network threshold. By way of non-limiting example, and in some embodiments, the AI engine may determine that the global internal distributed network threshold is associated with a higher value and the global external distributed network threshold is associated with a lower value. In such configurations, the AI engine may determine that the global internal distributed network threshold exceeds the global external distributed network threshold and may transmit a notification comprising the determination. In some embodiments, the AI engine may determine that the AI engine may determine that the internal network threshold is equal to and/or fails to exceed the external network threshold and may transmit a notification comprising the determination. According to some embodiments, the AI engine may generate network resource allocation recommendations based on at least the network comparison of the global internal distributed network threshold and the global external distributed network threshold and transmit a notification comprising the network resource allocation recommendations. In some embodiments the comparison of the global internal distributed network threshold and the global external distributed network threshold may comprise a graphical comparison within the directed graph interface.

As shown in block 514, the process flow 500 may include the step of transmitting a notification comprising the global network threat map and the network comparison. In some embodiments, the notification may comprise an email, text message, push-notification, alert, dashboard alert, and/or the like. In some embodiments, the notification may require authentication (e.g., multi-factor authentication, one-time password, physical attribute authentication, authenticator mobile application, PIN code, and/or the like) to access and read the notification. In some embodiments, the notification may comprise an encrypted message which may require a decrypting program to access and read the notification. In some embodiments of the disclosure, the notification may be transmitted to users, user devices associated with managers and/or operators of user devices and/or network devices associated with the managers and/or operators. According to some embodiments, the notification may comprise a prioritized list of global network threats and/or the network comparison.

FIG. 6 illustrates a process flow 600 for generating a user interface on a display and receiving control signals from at least one device to navigate the user interface, in accordance with an embodiment of the disclosure. In some embodiments, a system (e.g., similar to one or more of the systems described herein with respect to FIGS. 1A-1C) may perform one or more of the steps of process flow 600. For example, a network allocation and monitoring engine using artificial intelligence and dynamic mapping system (e.g., the system 130 described herein with respect to FIG. 1A-1C) may perform the steps of process flow 600. In some embodiments, an AI engine (e.g., such as the AI engine like that described in FIG. 2) may perform some or all of the steps described in process flow 600.

As shown in block 602, the process flow 600 may include the step of generating a user interface on a display, wherein the user interface comprises at least one interactive mixed reality application. In some embodiments, the at least one interactive mixed reality application may comprise at least one environment comprising virtual reality (VR), augmented reality (AR), and/or the like. According to some embodiments, the at least one interactive mixed reality application may be optimized based on at least one network device executing, hosting, and/or operating the at least one interactive mixed reality application. By way of non-limiting example, and in some embodiments, when the at least one interactive mixed reality application is executed via VR-enabled hardware (e.g., VR goggles, glasses, headset, mobile device, projector system, and/or the like), the at least one interactive mixed reality application may activate VR features. In some embodiments, when the at least one interactive mixed reality application is executed via AR-enabled hardware (e.g., AR goggles, glasses, headset, mobile device, projector system, heads-up display, and/or the like), the at least one interactive mixed reality application may activate AR features.

As shown in block 604, the process flow 600 may include the step of rendering an interactive dashboard and the directed graph within the user interface. In some embodiments, the system may generate and display the interactive dashboard for making modifications to the system, updating the AI engine, viewing analytics, and/or analyzing notifications. In some embodiments, a user may need to authenticate to gain access to the interactive dashboard. Authentication may comprise single factor authentication or multifactor authentication, wherein multifactor authentication requires at least two of a one-time password, unique security token generation and authentication, user credentials, physical characteristic authentication, a mobile authenticator application, codes received via messaging service, and/or the like. Once authenticated, a user may navigate the interactive dashboard to view and/or modify the directed graph and/or view analytics associated with at least one of the network threats, network resources, network resource catalysts, network threat catalysts, at least one network attribute set, at least one external network attribute set, internal distributed network resources allocation, error logs, internal network threshold, external network threshold, external distributed network resources allocation, and/or the like, according to some embodiments of the disclosure. In some embodiments, the user interface may comprise the directed graph interface, wherein the directed graph interface comprises the directed graph and/or the modified directed graph.

As shown in block 606, the process flow 600 may include the step of receiving control signals from at least one device to navigate the user interface, wherein the control signals modify the interactive dashboard and the directed graph within the user interface. In some embodiments, the control signals may comprise a trigger to modify the AI engine, retrain the AI engine, the at least one network attribute set, weight, external weight, the at least one external network attribute set, and/or the like. In some embodiments, the control signals modify at least one view of the directed graph within the interface. By way of non-limiting example, and in some embodiments, the control signals may manipulate a view to allow for dynamic re-rendering of the directed graph. In such configurations, AR and/or VR features may be utilized to provide a mixed-reality rendering of the directed graph and may allow a user to utilize control signals received via gesture control to adjust zoom, the viewing display, and/or the like. In some embodiments, the gesture controls may be associated with traversing at least one directed path dynamically, zooming to view a certain network switch checkpoint, viewing at least one subset of the directed graph, and/or the like.

In some embodiments, the at least one interactive mixed reality application may comprise a virtual competition projected within at least one AR and/or VR environment. According to some embodiments, each user device associated with the virtual competition may receive an allocation of network resources, determined and allocated via the AI engine, for utilization within the virtual competition. In such configurations, each user device would traverse at least one directed path, directed graph, plurality of directed graphs, and/or the like to determine which user device would be associated with the largest quantity of network resources at the termination of the virtual competition. The AI engine may determine a number of virtual competition participants and/or user devices for a virtual competition and may modify the display of the virtual competition and/or the at least one AR and/or VR environment in response to each participant joining the virtual competition, according to some embodiments.

In some embodiments, the at least one interactive mixed reality application may comprise a learning application to provide educational programs relating to network allocation and monitoring and/or network mapping. The AI engine may determine learning programs suitable to users based on at least historical data, user accounts, and/or the like to dynamically provide applicable learning programs within the at least one AR and/or VR environment. Based on each user's progress, the AI engine may analyze learning data and determine and recommend additional educational and/or learning programs to further educational development, in some embodiments.

FIG. 7 illustrates a process flow 700 for rendering a plurality of directed graphs and modifying at least one view of the plurality of directed graphs within the user interface, in accordance with an embodiment of the disclosure. In some embodiments, a system (e.g., similar to one or more of the systems described herein with respect to FIGS. 1A-1C) may perform one or more of the steps of process flow 700. For example, a network allocation and monitoring engine using artificial intelligence and dynamic mapping system (e.g., the system 130 described herein with respect to FIG. 1A-1C) may perform the steps of process flow 700. In some embodiments, an AI engine (e.g., such as the AI engine like that described in FIG. 2) may perform some or all of the steps described in process flow 700.

As shown in block 702, the process flow 700 may include the step of rendering a plurality of directed graphs within the user interface, wherein the plurality of directed graphs comprises the directed graph and at least one additional directed graph associated with an additional distributed network. The interface may comprise an AR and/or VR environment generated via enabled hardware (e.g., glasses, goggles, headset, mobile device, project system, heads-up display, and/or the like). In some embodiments, the AI engine may determine the hardware being utilized for viewing the user interface and enable and disable certain AR and/or VR features accordingly (e.g., if AR hardware utilized, disable VR features). According to some embodiments of the disclosure, the plurality of directed graphs may be associated with one or more directed graphs associated with internal distributed networks, external distributed networks, and/or the like. In some embodiments, the AI engine may render the global network threat map within the user inface to display in conjunction with the plurality of directed graphs.

As shown in block 704, the process flow 700 may include the step of receiving control signals from the at least one device associated with the at least one interactive mixed reality application, wherein the control signals comprise interactions with at least one of one or more physical controls or one or more virtual objects. According to some embodiments, controls associated with control signals may be projected within the AR and/or VR environment, wherein controls associated with the AR environment may comprise physical objects and virtual objects. In some embodiments, physical objects may be mapped to virtual objects, and controlling the physical object may control the virtual object, in some embodiments. Controls with the physical objects and virtual objects may comprise rotating, turning, swiping, executing a predetermined movement, and/or the like.

As shown in block 706, the process flow 700 may include the step of modifying at least one view of the plurality of directed graphs within the user interface based on at least the control signals. According to some embodiments, the at least one view may comprise a focus on a single directed graph within the user interface. The at least one view may be modified to include one or more additional graphs from the plurality of directed graphs, in some embodiments. The at least one view may be modified to highlight a certain node, network switch checkpoint, vector, and/or directed path in one or more directed graphs from the plurality of the directed graphs, in some embodiments. According to some embodiments of the disclosure, the at least one view may be modified within the AR and/or VR environment in response to an alert of a threat in the plurality of directed graphs, a notification from a network switch checkpoint, a distributed network resources allocation modification, a networks resources transfer, and/or the like. In some embodiments the at least one view may be modified to swipe from one directed graph to at least one or more directed graphs to evaluate network switch checkpoints, network resources, network threats, network resource catalysts, and/or network threat catalysts from the at least one or more directed graphs.

FIG. 8 illustrates a process flow 800 for training and retraining the AI engine, in accordance with an embodiment of the disclosure. In some embodiments, a system (e.g., similar to one or more of the systems described herein with respect to FIGS. 1A-1C) may perform one or more of the steps of process flow 800. For example, a network allocation and monitoring engine using artificial intelligence and dynamic mapping system (e.g., the system 130 described herein with respect to FIG. 1A-1C) may perform the steps of process flow 800. In some embodiments, an AI engine (e.g., such as the AI engine like that described in FIG. 2) may perform some or all of the steps described in process flow 800.

As shown in block 802, the process flow 800 may include the step of receiving at least one historical dataset. The historical dataset may be stored in an internal data repository, hosted externally by an external network administrator, and/or the like. In some embodiments, the system may collect, compile, and/or aggregate historical data to create the historical dataset and may store the historical dataset in an internal data repository. In such a configuration, the system may access and retrieve the historical dataset each time the AI engine may be trained.

As shown in block 804, the process flow 800 may include the step of training the AI engine based on the at least one historical dataset, wherein the at least one historical dataset comprises at least one of historical network resources, historical network threats, historical network attribute sets, historical weights for historical network attribute sets, historical directed graphs associated with distributed networks, historical internal network thresholds, historical internal distributed network resources allocations, historical external network data packets, historical external network resources, historical external network threats, historical external network resources allocations, historical external network attribute sets, historical external network thresholds, historical directed graphs, or historical comparisons of the internal network threshold and the external network threshold.

In some embodiments, the system may receive the historical dataset continuously, at set internals, and/or via on-demand request generated by the AI engine, a user, an AI engine training controller, and/or the like. In some embodiments, the system may receive the entire at least one historical dataset. According to sone embodiments, the system may only receive a subset of data contained within the historical dataset based on training requirements associated with an AI engine training request generated by the system, user, and/or the like. By training the AI engine on only a subset of the historical dataset based on the most material and/or relevant data, the system may conserve computing resources, minimize energy expenditures, and enhance the AI engine performance.

As shown in block 806, the process flow 800 may include the step of receiving network packet vulnerability data. In some embodiments, receiving the network packet vulnerability data may comprise receiving network data packets comprising the network packet vulnerability data. In some embodiments, a data aggregator may collect network packet vulnerability data to generate aggregated network packet vulnerability data and transmit the aggregated network packet vulnerability data via network data packets to the system. In some embodiments, the data aggregator may pre-process the network packet vulnerability data, such as data cleansing, encrypting, and/or executing an ETL process. In some embodiments, the system may process the received network data packets, such as executing decryption, data extraction, and/or the like.

As shown in block 808, the process flow 800 may include the step of updating the at least one historical dataset with the network packet vulnerability data. In some embodiments, the network packet vulnerability data may be attached to the at least one historical dataset. In such a configuration, an ETL process may be executed to transmit the network packet vulnerability data dataset to the same data storage repository as the at least one historical dataset.

As shown in block 810, the process flow 800 may include the step of retraining the AI engine based on the network packet vulnerability data. The retraining step may be executed via feedback loop for continuous retraining and/or the retraining may occur via batch jobs, according to some embodiments. In some embodiments, the AI engine may refine itself by revising its weights and other such decision factors to improve accuracy, speed, and minimize errors, based on AI engine training confidence threshold. In some embodiments, the system may determine the AI engine training confidence threshold, and if the AI engine training confidence threshold is below a given confidence threshold (e.g., predetermined, determined via notification from a network device, and/or dynamically determined by the system), the system may trigger retraining of the AI engine. In some embodiments, if new resource transfer criteria, network rule criteria, validation criteria, and/or network packet threat data are generated and/or received by the system (hereinafter referred to as "new training factors"), then the system may trigger in real-time retraining of the AI engine based on the new training factors. By constantly monitoring for new training factors and triggering a responsive real-time retraining, the system provides a technical solution to the challenge of monitoring new training factors and changing network conditions and adjusting the system dynamically.

FIG. 9 illustrates a process flow 900 for generating a network event forecast AI engine and transmitting revisions for internal distributed network resources allocation, in accordance with an embodiment of the disclosure. In some embodiments, a system (e.g., similar to one or more of the systems described herein with respect to FIGS. 1A-1C) may perform one or more of the steps of process flow 900. For example, a network allocation and monitoring engine using artificial intelligence and dynamic mapping system (e.g., the system 130 described herein with respect to FIG. 1A-1C) may perform the steps of process flow 900. In some embodiments, an AI engine (e.g., such as the AI engine like that described in FIG. 2) may perform some or all of the steps described in process flow 900.

As shown in block 902, the process flow 900 may include the step of generating a network event forecast AI engine. In some embodiments, the network event forecast AI engine comprises an AI engine that may forecast network events based on at least the data, historical dataset, network resources, network threats, network resource catalysts, network threat catalysts, external network resources, external network threats, external network threat catalysts, and/or the like. The network event forecast AI engine may be pretrained with historical data, trained continuously using real-time data, and/or the like. In some embodiments, the network event forecast AI engine may predict future network events based on historical data and/or real-time data, wherein the real-time data comprises known network threats (e.g., network security, data security, unauthorized access, malware, security incidents, and/or the like), network resources, known network resource catalysts, known network threat catalysts, and or the like.

As shown in block 904, the process flow 900 may include the step of receiving network event data associated with network switch checkpoints. In some embodiments, network event data may comprise factors associated with network event triggers, including without limitation network resources (e.g., known network resources and/or forecast network resources), network threats (e.g., known network threats and/or forecast network threats), external network resources, external network threats, and/or the like. In some embodiments, network switch checkpoints comprise decision nodes within at least one network and/or directed graph. According to some embodiments of the disclosure, the network switch checkpoint may comprise a decision node wherein the AI engine determines network resource allocations prior to continuing through the directed path. In some embodiments, the network switch checkpoints may require a network resource transfer to gain access to and/or traverse at least one directed path of the directed graph. In response to the requirement, the AI engine and/or network device may determine and execute a network resource transfer to gain access to and/or traverse at least one directed path of the directed graph, according to some embodiments.

As shown in block 906, the process flow 900 may include the step of determining, using the network event forecast AI engine, a network event threshold based on the network event data associated with network switch checkpoints. The network event threshold may comprise a qualitative descriptor, quantitative value, and/or the like, in some embodiments. In some embodiments, the network event threshold may comprise a decision gate to bypass and/or receive permission to pass through a network switch checkpoint to continue traversing the directed path. In some embodiments, the network event threshold may comprise a binary threshold, so that it may block access to the directed path if the network event threshold is not met and/or exceeded. By way of non-limiting example, and in some embodiments, the network event threshold may be met and/or exceeded if the internal network threshold exceeds the external network threshold at a given network switch checkpoint. In some embodiments, the network switch checkpoint may allow a bypass (e.g., allow passage based on internal network threshold exceeding a predefined target) and/or determine that the network threshold is exceeded and grant permission to continue traversing the directed path. In such configurations, the internal distributed network resource allocation may remain unchanged and/or may be modified by the system, AI engine, by user request, and/or the like. By way of non-limiting example, and in some embodiments, the network event threshold may not be met if the external network threshold exceeds the internal network threshold at a given network switch checkpoint. In such configurations, the internal distributed network resource allocation may be modified, by the system, AI engine, by user request, and/or the like, to reallocate network resources along a different vertex, edge, network switch checkpoint, and/or the like. According to some embodiments, a network resource transfer may be executed to modify the internal distributed network resources allocation, thereby increasing network resources at a network switch checkpoint. In such configurations, and in some embodiments, the AI engine may determine that the internal network threshold thereafter exceeds the external network threshold, which may facilitate a bypass of the network switch checkpoint and/or grant access to the directed path.

As shown in block 908, the process flow 900 may include the step of generating, using the network event forecast AI engine, revisions for the internal distributed network resources allocation based on at least the network event threshold. Based on determining the network event threshold, and in some embodiments, the AI engine may generate revisions to internal distributed network resources allocation across an entire directed graph, across a plurality of directed graphs, one or more network switch checkpoints, a directed path, and/or the like. According to some embodiments, when the network event threshold is not exceeded, the AI engine may generate revisions to decrease and/or withdraw all internal distributed network resources allocation and/or generate revisions to reallocate the internal distributed network resources allocation to one or more other directed graphs, network switch checkpoint, directed path, and/or the like. In some embodiments, when the network event threshold is exceeded, the AI engine may generate revisions to increase the internal distributed network resources allocation, keep internal distributed network resources allocation constant at one or more network switch checkpoints, and/or modify internal distributed network resources allocation at different network switch checkpoints, directed paths, directed graphs, and/or the like.

As shown in block 910, the process flow 900 may include the step of transmitting the revisions for the internal distributed network resources allocation based on at least the network event threshold via notification. In some embodiments, the notification may comprise an email, text message, push-notification, alert, dashboard alert, and/or the like. In some embodiments, the notification may require authentication (e.g., multi-factor authentication, one-time password, physical attribute authentication, authenticator mobile application, PIN code, and/or the like) to access and read the notification. In some embodiments, the notification may comprise an encrypted message which may require a decrypting program to access and read the notification. In some embodiments of the disclosure, the notification may be transmitted to users, user devices associated with managers and/or operators of user devices and/or network devices associated with the threat map. According to some embodiments, the notification may comprise control buttons, wherein the control buttons (e.g., approve, reject, modify, and/or the like) may implement the revisions to the internal distributed network resources allocation. In a non-limited example, and in some embodiments, a user selecting an "approve" control button may trigger the implementation of the revisions to the internal distributed network resources allocation, which may comprise network resource transfers as part of reallocation.

FIG. 10 illustrates a process flow 1000 for determining, using the AI engine, an allocation threshold associated with the internal network threshold and generating an alert, in accordance with an embodiment of the disclosure. In some embodiments, a system (e.g., similar to one or more of the systems described herein with respect to FIGS. 1A-1C) may perform one or more of the steps of process flow 1000. For example, a network allocation and monitoring engine using artificial intelligence and dynamic mapping system (e.g., the system 130 described herein with respect to FIG. 1A-1C) may perform the steps of process flow 1000. In some embodiments, an AI engine (e.g., such as the AI engine like that described in FIG. 2) may perform some or all of the steps described in process flow 1000.

As shown in block 1002, the process flow 1000 may include the step of determining, using the AI engine, an allocation threshold associated with the internal network threshold. In some embodiments, the allocation threshold may comprise a qualitative descriptor, quantitative value, and/or the like, in some embodiments. In some embodiments, the qualitative descriptor of the allocation threshold may comprise a letter grade (e.g., A to F), a written description (e.g., high, medium, low, and/or the like), and/or the like. In some embodiments, the quantitative value of the allocation threshold may comprise a numerical rating (e.g., whole number, decimals, and/or the like) on a spectrum (e.g., from zero to one hundred), wherein smaller numerical ratings may be associated with lower allocation thresholds and higher numerical ratings may be associated with higher allocation thresholds. According to some embodiments, the allocation threshold may comprise a minimum rating and/or confidence level associated at least one of network resources, network resource catalysts, internal network threshold, network threats, network threat catalysts, at least one network attribute set, directed path, directed graph, and/or the like. By way of non-limiting example, and in some embodiments, if an allocation threshold is not met, the AI engine and/or system may intercept an internal distributed network resources allocation to prevent further allocation, assignment, and/or transfer of internal distributed network resources allocation and/or network resources. In some embodiments, if an allocation threshold is met and/or exceeded, the AI engine and/or system may not trigger an interception of an internal distributed network resources allocation and/or trigger additional allocation, assignment, and/or transfer of internal distributed network resources allocation and/or network resources. An allocation threshold may be associated with a directed graph, internal network threshold, directed graph, directed path, plurality of directed graphs, network switch checkpoint, node, vector, and/or the like. In some embodiments, the AI engine may determine the allocation threshold continuously, on a periodic interval schedule, or on-demand via request. In some embodiments, the allocation threshold may be determined dynamically by the AI engine as data is constantly received and network conditions evolve.

As shown in block 1004, the process flow 1000 may include the step of generating at least one alert based on at least the allocation threshold. In some embodiments, the notification may comprise an email, text message, push-notification, alert, dashboard alert, and/or the like. In some embodiments, the notification may require authentication (e.g., multi-factor authentication, one-time password, physical attribute authentication, authenticator mobile application, PIN code, and/or the like) to access and read the notification. In some embodiments, the notification may comprise an encrypted message which may require a decrypting program to access and read the notification. In some embodiments of the disclosure, the notification may be transmitted to users, user devices associated with managers and/or operators.

In some embodiments the notification may comprise a message comprising recommendations generated by the AI engine for corrective responsive actions to modify the internal distributed network resources allocation based on the allocation threshold. According to some embodiments, the notification may comprise text and/or graphics comprising corrective responsive actions determined and executed by the AI engine to revise the internal distributed network resources allocation. Corrective responsive actions may comprise network resource transfers between network switch checkpoints, nodes, vertexes, vectors, edges, directed paths, directed graphs, and/or the like to modify the internal distributed network resources allocation, in some embodiments.

FIG. 11 illustrates a process flow 1100 for generating and transmitting, using the AI engine, an alert comprising the internal distributed network resources allocation, in accordance with an embodiment of the disclosure. In some embodiments, a system (e.g., similar to one or more of the systems described herein with respect to FIGS. 1A-1C) may perform one or more of the steps of process flow 1100. For example, a network allocation and monitoring engine using artificial intelligence and dynamic mapping system (e.g., the system 130 described herein with respect to FIG. 1A-1C) may perform the steps of process flow 1100. In some embodiments, an AI engine (e.g., such as the AI engine like that described in FIG. 2) may perform some or all of the steps described in process flow 1100.

As shown in block 1102, the process flow 1100 may include the step of accessing the network packet vulnerability data. In some embodiments, accessing the network packet vulnerability data may comprise the AI engine generating and executing a query of at least one internal database to access and retrieve the network packet vulnerability data. In some embodiments, the system may access the network packet vulnerability data dynamically as it is received.

As shown in block 1104, the process flow 1100 may include the step of determining, using the AI engine, to delete the internal distributed network resources allocation based on at least the network packet vulnerability data. In some embodiments, determining to delete the internal distributed network resources allocation may be based on a user request, a determination by the AI engine, and/or the like. Deleting the internal distributed network resources allocation may comprise executing a network resource transfer of all internal distributed network resources previously allocated (e.g., allocated to node, vertex, edge, directed path, directed graph, network switch checkpoint, and/or the like), according to some embodiments. In some embodiments, deleting the internal distributed network resources allocation may comprise updating the internal distributed network resources allocation to a rating of zero. According to some embodiments, deleting the internal distributed network resources allocation may comprise transferring previously allocated internal distributed network resources to a reserve for later allocation.

As shown in block 1106, the process flow 1100 may include the step of generating and transmitting, using the AI engine, an alert comprising the internal distributed network resources allocation. In some embodiments the alert may comprise a message comprising recommendations generated by the AI engine for corrective responsive actions to modify the internal distributed network resources allocation based on the allocation threshold. According to some embodiments, the alert may comprise text and/or graphics comprising corrective responsive actions determined and executed by the AI engine to revise the internal distributed network resources allocation. Corrective responsive actions may comprise network resource transfers between network switch checkpoints, nodes, vertexes, vectors, edges, directed paths, directed graphs, and/or the like to modify the internal distributed network resources allocation, in some embodiments.

In some embodiments, the alert may comprise revisions to the internal distributed network resources allocation for each directed graph, plurality of directed graphs, directed path, network switch checkpoint, and/or the like. The revisions to the internal distributed network resources allocation may comprise lower internal distributed network resources allocations and/or higher internal distributed network resources after modifications have been executed.

In some embodiments, the alert may comprise an email, text message, push-notification, alert, dashboard alert, and/or the like. In some embodiments, the alert may require authentication (e.g., multi-factor authentication, one-time password, physical attribute authentication, authenticator mobile application, PIN code, and/or the like) to access and read the alert. In some embodiments, the alert may comprise an encrypted message which may require a decrypting program to access and read the notification.

FIG. 12 illustrates a process flow 1200 for generating, using the AI engine a revised internal distributed network resources allocation, in accordance with an embodiment of the disclosure. In some embodiments, a system (e.g., similar to one or more of the systems described herein with respect to FIGS. 1A-1C) may perform one or more of the steps of process flow 1200. For example, a network allocation and monitoring engine using artificial intelligence and dynamic mapping system (e.g., the system 130 described herein with respect to FIG. 1A-1C) may perform the steps of process flow 1200. In some embodiments, an AI engine (e.g., such as the AI engine like that described in FIG. 2) may perform some or all of the steps described in process flow 1200.

As shown in block 1202, the process flow 1200 may include the step of receiving a request from at least one device, wherein the request comprises revised network data. In some embodiments, the revised network data may comprise revisions to the network resources, network threats, network resource catalysts, network threat catalysts, internal network threshold, external network threshold, external network catalysts, external threat catalysts, at least one internal network attribute set, at least one external network attribute set, and/or the like. According to some embodiments, the request may comprise to simulate network events, update the internal distributed network resources allocation, and/or the like.

As shown in block 1204, the process flow 1200 may include the step of authenticating the request via multifactor authentication, wherein the multifactor authentication comprises at least two of a one-time password, a physical attribute authentication, authentication application, and authentication credentials. In some embodiments, the request may comprise the authentication methods required for the multifactor authentication. According to some embodiments, the multifactor authentication may be determined by the AI engine based on at least data security requirements, network access controls, known threats, privacy requirements, geographic regulatory requirements, and/or the like. In some embodiments, the request may comprise an encrypted message which may require decryption via the AI engine to access and read the request.

As shown in block 1206, the process flow 1200 may include the step of revising, using the AI engine, at least one of the at least one network attribute set, the directed graph, and the internal network threshold based on the request, wherein the request comprises updating the network resources and network threats. In some embodiments, the AI engine may revise, based on the request, the network resource catalysts, network threat catalysts, internal network threshold, external network threshold, external network catalysts, external threat catalysts, at least one internal network attribute set, at least one external network attribute set, and/or the like. According to some embodiments, the request may comprise simulating network events, updating the internal distributed network resources allocation, and/or the like. The AI engine may execute updates to the internal distributed network resources allocation dynamically, on-demand, or via internal batch processing, according to some embodiments.

As shown in block 1208, the process flow 1200 may include the step of generating, using the AI engine a revised internal distributed network resources allocation. The revised internal distributed network resources allocation may comprise an updated assignment, commitment to transfer, and/or transfer of internal distributed network resources, in some embodiments. According to some embodiments of the disclosure, the AI engine may trigger and execute a network resource transfer based on at least the revised internal distributed network resources allocation. The AI engine may regenerate the internal distributed network resources allocation for each network switch checkpoint, node in the directed graph, and/or the like, in some embodiments. In some embodiments, the revised internal distributed network resources allocation may comprise a simulated updated assignment, commitment to transfer, and/or transfer of internal distributed network resources to forecast changing network conditions and associated changes to the internal distributed network resources allocation.

As shown in block 1210, the process flow 1200 may include the step of transmitting the revised internal distributed network resources allocation via notification. In some embodiments, the notification may comprise an email, text message, push-notification, alert, dashboard alert, and/or the like. In some embodiments, the notification may require authentication (e.g., multi-factor authentication, one-time password, physical attribute authentication, authenticator mobile application, PIN code, and/or the like) to access and read the notification. In some embodiments, the notification may comprise an encrypted message which may require a decrypting program to access and read the notification. In some embodiments, the notification may comprise a confirmation message indicating a successful network resource transfer based on at least the revised internal distributed network resources allocation.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for network allocation and monitoring engine using artificial intelligence and dynamic mapping, the system comprising:
- a memory device with computer-readable program code stored thereon;
- at least one processing device, wherein executing the computer-readable program code is configured to cause the at least one processing device to execute the computer-readable program code to:
  - extract data from network data packets received from at least one or more data sources;
  - identify, using an AI engine, network resources and network threats from the data;
  - generate, using the AI engine, at least one network attribute set based on at least the network resources and network threats;
  - determine and assign, using the AI engine, a weight for each of the at least one network attribute set;
  - generate, using the AI engine, a directed graph based on at least the network attribute set, wherein the directed graph is associated with at least one distributed network;
  - determine, using the AI engine, an internal network threshold based on at least the directed graph; and
  - generate, using the AI engine, an internal distributed network resources allocation based on at least the directed graph and the internal network threshold.

2. The system of claim 1, wherein executing the computer-readable program code is further configured to cause the at least one processing device to:
- extract external data from external network data packets received from at least one external distributed network;
- determine, using the AI engine, external network resources, external network threats, and an external distributed network resources allocation from the external data;
- generate, using the AI engine, at least one external network attribute set based on at least the external network resources, external network threats, and the external distributed network resources allocation;
- determine and assign, using the AI engine, an external weight for each of the at least one external network attribute set;
- modify, using the AI engine, the directed graph based on at least the external network attribute set;
- determine, using the AI engine, an external network threshold based on at least the directed graph and the external distributed network resources allocation; and
- generate, using the AI engine, a comparison of the internal network threshold and the external network threshold.

3. The system of claim 2, wherein executing the computer-readable program code is further configured to cause the at least one processing device to:
- receive the internal network threshold and the internal distributed network resources allocation for each at least one internal distributed network and the external distributed network resources allocation and the external network threshold for each at least one at least one external distributed network;
- generate and assign, using the AI engine, a global internal distributed network weight based on at least the internal network threshold and the internal distributed network resources allocation for each at least one internal distributed network;
- generate and assign, using the AI engine, a global external distributed network weight based on at least the external network threshold and the external distributed network resources allocation for each at least one external distributed network;
- determine, using the AI engine, a global internal distributed network threshold based on at least the global internal distributed network weight;
- determine, using the AI engine, a global external distributed network threshold based on at least the global external distributed network weight;
- generate, using the AI engine, a global network threat map and a network comparison of the global internal distributed network threshold and the global external distributed network threshold; and
- transmit a notification comprising the global network threat map and the network comparison.

4. The system of claim 1, wherein executing the computer-readable program code is further configured to cause the at least one processing device to:
- generate a user interface on a display, wherein the user interface comprises at least one interactive mixed reality application;
- render an interactive dashboard and the directed graph within the user interface; and
- receive control signals from at least one device to navigate the user interface, wherein the control signals modify the interactive dashboard and the directed graph within the user interface.

5. The system of claim 4, wherein executing the computer-readable program code is further configured to cause the at least one processing device to:
- render a plurality of directed graphs within the user interface, wherein the plurality of directed graphs comprises the directed graph and at least one additional directed graph associated with an additional distributed network;
- receive control signals from the at least one device associated with the at least one interactive mixed reality application, wherein the control signals comprise interactions with at least one of one or more physical controls or one or more virtual objects; and
- modify at least one view of the plurality of directed graphs within the user interface based on at least the control signals.

6. The system of claim 2, wherein executing the computer-readable program code is further configured to cause the at least one processing device to:
- receive at least one historical dataset;
- train the AI engine based on the at least one historical dataset, wherein the at least one historical dataset comprises at least one of historical network resources, historical network threats, historical network attribute sets, historical weights for historical network attribute sets, historical directed graphs associated with distributed networks, historical internal network thresholds, historical internal distributed network resources allocations, historical external network data packets, historical external network resources, historical external network threats, historical external network resources allocations, historical external network attribute sets, historical external network thresholds, historical directed graphs, or historical comparisons of the internal network threshold and the external network threshold;

receive network packet vulnerability data;

update the at least one historical dataset with the network packet vulnerability data; and retrain the AI engine based on the network packet vulnerability data.

7. The system of claim 1, wherein executing the computer-readable program code is further configured to cause the at least one processing device to:

generate a network event forecast AI engine;

receive network event data associated with network switch checkpoints;

determining, using the network event forecast AI engine, a network event threshold based on the network event data associated with network switch checkpoints;

generate, using the network event forecast AI engine, revisions for the internal distributed network resources allocation based on at least the network event threshold; and transmit the revisions for the internal distributed network resources allocation based on at least the network event threshold via notification.

8. The system of claim 1, wherein executing the computer-readable program code is further configured to cause the at least one processing device to:

determine, using the AI engine, an allocation threshold associated with the internal network threshold; and generate at least one alert based on at least the allocation threshold.

9. The system of claim 6, wherein executing the computer-readable program code is further configured to cause the at least one processing device to:

access the network packet vulnerability data;

determine, using the AI engine, to delete the internal distributed network resources allocation based on at least the network packet vulnerability data; and generate and transmit, using the AI engine, an alert comprising the internal distributed network resources allocation.

10. The system of claim 1, wherein executing the computer-readable program code is further configured to cause the at least one processing device to:

receive a request from at least one device, wherein the request comprises revised network data;

authenticate the request via multifactor authentication, wherein the multifactor authentication comprises at least two of a one-time password, a physical attribute authentication, authentication application, and authentication credentials;

revise, using the AI engine, at least one of the at least one network attribute set, the directed graph, and the internal network threshold based on the request, wherein the request comprises updating the network resources and network threats;

generate, using the AI engine a revised internal distributed network resources allocation; and transmit the revised internal distributed network resources allocation via notification.

11. A computer program product for network allocation and monitoring engine using artificial intelligence and dynamic mapping, wherein the computer program product comprises at least one non-transitory computer-readable medium having computer-readable program code portion embodied therein, the computer-readable program code portions which when executed by a processing device are configured to cause a processor to:

extract data from network data packets received from at least one or more data sources;

identify, using an AI engine, network resources and network threats from the data;

generate, using the AI engine, at least one network attribute set based on at least the network resources and network threats;

determine and assign, using the AI engine, a weight for each of the at least one network attribute set;

generate, using the AI engine, a directed graph based on at least the network attribute set, wherein the directed graph is associated with at least one distributed network;

determine, using the AI engine, an internal network threshold based on at least the directed graph; and generate, using the AI engine, an internal distributed network resources allocation based on at least the directed graph and the internal network threshold.

12. The computer program product of claim 11, wherein the processing device is further configured to:

extract external data from external network data packets received from at least one external distributed network;

determine, using the AI engine, external network resources, external network threats, and an external distributed network resources allocation from the external data;

generate, using the AI engine, at least one external network attribute set based on at least the external network resources, external network threats, and the external distributed network resources allocation;

determine and assign, using the AI engine, an external weight for each of the at least one external network attribute set;

modify, using the AI engine, the directed graph based on at least the external network attribute set;

determine, using the AI engine, an external network threshold based on at least the directed graph and the external distributed network resources allocation; and generate, using the AI engine, a comparison of the internal network threshold and the external network threshold.

13. The computer program product of claim 12, wherein the processing device is further configured to:

receive the internal network threshold and the internal distributed network resource allocation for each at least one internal distributed network and the external distributed network resources allocation and the external network threshold for each at least one at least one external distributed network;

generate and assign, using the AI engine, a global internal distributed network weight based on at least the internal network threshold and the internal distributed network resources allocation for each at least one internal distributed network;

generate and assign, using the AI engine, a global external distributed network weight based on at least the external network threshold and the external distributed network resources allocation for each at least one external distributed network;

determine, using the AI engine, a global internal distributed network threshold based on at least the global internal distributed network weight;

determine, using the AI engine, a global external distributed network threshold based on at least the global external distributed network weight;

generate, using the AI engine, a global network threat map and a network comparison of the global internal distributed network threshold and the global external distributed network threshold; and transmit a notification comprising the global network threat map and the network comparison.

14. The computer program product of claim 11, wherein the processing device is further configured to:

generate a user interface on a display, wherein the user interface comprises at least one interactive mixed reality application;

render an interactive dashboard and the directed graph within the user interface; and receive control signals from at least one device to navigate the user interface, wherein the control signals modify the interactive dashboard and the directed graph within the user interface.

15. The computer program product of claim 11, wherein the processing device is further configured to:

generate a network event forecast AI engine;

receive network event data associated with network switch checkpoints;

determining, using the network event forecast AI engine, a network event threshold based on the network event data associated with network switch checkpoints;

generate, using the network event forecast AI engine, revisions for the internal distributed network resources allocation based on at least the network event threshold; and transmit the revisions for the internal distributed network resources allocation based on at least the network event threshold via notification.

16. The computer program product of claim 11, wherein the processing device is further configured to:

determine, using the AI engine, an allocation threshold associated with the internal network threshold; and generate at least one alert based on at least the allocation threshold.

17. The computer program product of claim 11, wherein the processing device is further configured to:

receive a request from at least one device, wherein the request comprises revised network data;

authenticate the request via multifactor authentication, wherein the multifactor authentication comprises at least two of a one-time password, a physical attribute authentication, authentication application, and authentication credentials;

revise, using the AI engine, at least one of the at least one network attribute set, the directed graph, and the internal network threshold based on the request, wherein the request comprises updating the network resources and network threats;

generate, using the AI engine a revised internal distributed network resources allocation; and transmit the revised internal distributed network resources allocation via notification.

18. A computer-implemented method for network allocation and monitoring engine using artificial intelligence and dynamic mapping:

extracting data from network data packets received from at least one or more data sources;

identifying, using an AI engine, network resources and network threats from the data;

generating, using the AI engine, at least one network attribute set based on at least the network resources and network threats;

determining and assigning, using the AI engine, a weight for each of the at least one network attribute set;

generating, using the AI engine, a directed graph based on at least the network attribute set, wherein the directed graph is associated with at least one distributed network;

determining, using the AI engine, an internal network threshold based on at least the directed graph; and generating, using the AI engine, an internal distributed network resources allocation based on at least the directed graph and the internal network threshold.

19. The computer-implemented method of claim 18, wherein the computer-implemented method is further configured for:

extracting external data from external network data packets received from at least one external distributed network;

determining, using the AI engine, external network resources, external network threats, and an external distributed network resources allocation from the external data;

generating, using the AI engine, at least one external network attribute set based on at least the external network resources, external network threats, and the external distributed network resources allocation;

determining and assigning, using the AI engine, an external weight for each of the at least one external network attribute set;

modifying, using the AI engine, the directed graph based on at least the external network attribute set;

determining, using the AI engine, an external network threshold based on at least the directed graph, and the external distributed network resources allocation; and generating, using the AI engine, a comparison of the internal network threshold and the external network threshold.

20. The computer-implemented method of claim 18, wherein the computer-implemented method is further configured for:

generating a user interface on a display, wherein the user interface comprises at least one interactive mixed reality application;

rendering an interactive dashboard and the directed graph within the user interface; and receiving control signals from at least one device to navigate the user interface, wherein the control signals modify the interactive dashboard and the directed graph within the user interface.

* * * * *